US011341668B2

(12) United States Patent
Suto

(10) Patent No.: US 11,341,668 B2
(45) Date of Patent: May 24, 2022

(54) DISTANCE MEASURING CAMERA

(71) Applicant: MITSUMI ELECTRIC CO., LTD., Tama (JP)

(72) Inventor: Satoru Suto, Tama (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/260,196

(22) PCT Filed: Jul. 8, 2019

(86) PCT No.: PCT/JP2019/026991
§ 371 (c)(1),
(2) Date: Jan. 13, 2021

(87) PCT Pub. No.: WO2020/017377
PCT Pub. Date: Jan. 23, 2020

(65) Prior Publication Data
US 2021/0279903 A1    Sep. 9, 2021

(30) Foreign Application Priority Data

Jul. 18, 2018 (JP) .............................. JP2018-135167
Oct. 23, 2018 (JP) .............................. JP2018-199370

(51) Int. Cl.
*G06T 7/593* (2017.01)
*H04N 13/239* (2018.01)
*G01C 3/08* (2006.01)

(52) U.S. Cl.
CPC ................ *G06T 7/593* (2017.01); *G01C 3/08* (2013.01); *H04N 13/239* (2018.05); *G06T 2207/10028* (2013.01)

(58) Field of Classification Search
CPC ......... G06T 7/593; H04N 13/239; G01C 3/08
See application file for complete search history.

(56) References Cited

U.S. PATENT DOCUMENTS

2009/0214107 A1\* 8/2009 Masuda .................. G06T 7/593
382/154
2012/0293633 A1    11/2012 Yamato
(Continued)

FOREIGN PATENT DOCUMENTS

JP    H03200007 A    9/1991
JP    2001124519 A    5/2001
(Continued)

OTHER PUBLICATIONS

ISA Japan Patent Office, International Search Report Issued in Application No. PCT/JP2019/026991, dated Aug. 13, 2019, WIPO, 4 pages.
(Continued)

*Primary Examiner* — Kathleen V Nguyen
(74) *Attorney, Agent, or Firm* — McCoy Russell LLP

(57) ABSTRACT

A distance measuring camera contains a first imaging system for obtaining a first image containing a first subject image, a second imaging system for obtaining a second image containing a second subject image, a size obtaining part for detecting a plurality of feature points of the first subject image in the first image and measure a distance between the feature points of the first subject image to obtain a size of the first subject image and utilizes an epipolar line to detect a plurality of feature points of the second subject image respectively corresponding to the plurality of feature points of the first subject image and measures a distance between the feature points of the second subject image to obtain a size of the second subject image and a distance calculating part for calculating a distance to the subject based an image magnification ratio between a magnification of the first subject image and a magnification of the first subject image and a magnification of the second subject image.

10 Claims, 8 Drawing Sheets

(56) References Cited

U.S. PATENT DOCUMENTS

| 2013/0057655 A1* | 3/2013 | Su ........................... G02B 7/28 |
| | | 348/47 |
| 2017/0113611 A1* | 4/2017 | Thompson .............. G06T 7/593 |

FOREIGN PATENT DOCUMENTS

| JP | 2001141422 A | 5/2001 |
| JP | 2012002683 A | 1/2012 |
| JP | 2012026841 A | 2/2012 |
| JP | 2019109124 A | 7/2019 |

OTHER PUBLICATIONS

European Patent Office, Extended European Search Report Issued in Application No. 19837673.3, dated Mar. 17, 2022, Germany, 11 pages.

* cited by examiner

DISTANCE MEASURING CAMERA

CROSS REFERENCE TO RELATED APPLICATIONS

The present application is a U.S. National Phase of International Application No. PCT/JP2019/026991 entitled "RANGING CAMERA," and filed on Jul. 8, 2019. International Application No. PCT/JP2019/026991 claims priority to Japanese Patent Application No. 2018-135167 filed on Jul. 18, 2018 and Japanese Patent Application No. 2018-199370 filed on Oct. 23, 2018. The entire contents of each of the above-listed applications are hereby incorporated by reference for all purposes.

TECHNICAL FIELD

The present invention generally relates to distance measuring cameras for measuring a distance to a subject, in particular to a distance measuring camera for measuring a distance to a subject based on an image magnification ratio between at least two subject images respectively formed by at least two optical systems whose changes of magnitudes of the subject images according to the distance to the subject are different from each other.

BACKGROUND AND SUMMARY

Conventionally, there is proposed a distance measuring camera for measuring a distance to a subject by imaging the subject. As such a distance measuring camera, a stereo camera type distance measuring camera including two or more pairs of an optical system for collecting light from a subject to form a subject image and an image sensor for converting the subject image formed by the optical system to an image data (for example, see patent document 1).

The stereo camera type distance measuring camera as disclosed in the patent document 1 calculates a parallel disparity (disparity in a direction perpendicular to an optical axis direction) between the two subject images respectively formed by the two optical systems arranged so as to be shifted from each other in the direction perpendicular to the optical axis direction and calculates the distance to the subject based on a value of the parallel disparity.

This stereo camera type distance measuring camera cannot accurately calculate the distance to the subject when the parallel disparity between the subject images is small. Thus, it is necessary to arrange the two optical systems so as to be largely spaced apart from each other in the direction perpendicular to the optical axis in order to sufficiently increase the parallel disparity between the subject images. This makes it difficult to reduce a size of the distance measuring camera.

Further, when the subject is located at a near distance from the distance measuring camera, there may be a situation that a feature point of the subject image for calculating the parallel disparity exists in one of two obtained image data and does not exist in the other one of the two obtained image data due to a relationship of visual fields of the two obtained image data. In order to avoid this situation, it is necessary to arrange the two optical systems so as to be close to each other. However, if the two optical systems are arranged so as to be close to each other, the parallel disparity between the subject images decreases and thus accuracy of the distance measurement reduces. Therefore, it is difficult to accurately calculate the distance to the subject located at the near distance from the distance measuring camera with the distance measurement based on the parallel disparity between the subject images.

To address this problem, an image magnification ratio type distance measuring camera for calculating a distance to a subject based on an image magnification ratio between two subject images (ratio between magnifications of the two subject images) has been proposed by the inventor of the present invention and others. The image magnification ratio type distance measuring camera uses two optical systems configured so that changes of magnifications of subject images respectively formed by the two optical systems according to the distance to the subject are different from each other and calculates the distance to the subject based on the image magnification ratio between the two subject images (the ratio between the magnifications of the two subject images) respectively formed by the two optical systems (see patent document 2).

In this image magnification ratio type distance measuring camera, the parallel disparity between the subject images is not utilized for calculating the distance to the subject. Thus, even if the two optical systems are arranged so as to be close to each other, the image magnification ratio type distance measuring camera can accurately calculate the distance to the subject. Therefore, it is possible to reduce the size of the distance measuring camera. Further, since the image magnification ratio between the subject images can be accurately obtained even when the subject is located at the near distance from the distance measuring camera, the image magnification ratio type distance measuring camera can accurately calculate the distance to the subject located at the near distance.

The image magnification ratio between the subject images is calculated from a ratio between sizes of the two subject images. In order to obtain the sizes of the subject images, it is necessary to detect a plurality of feature points of the subject image (for example, both edge portions of the subject to be measured in a height direction or a width direction of the subject) in image data obtained by imaging the subject image and measure a distance between the feature points in the image data. Further, in order to obtain the image magnification ratio between the subject images, it is necessary to obtain sizes of same parts of the two subject images. Therefore, after detecting the plurality of feature points of one of the subject images, it is necessary to perform a corresponding feature point detection process for detecting a plurality of feature points of the other one of the subject images respectively corresponding to the plurality of detected feature points of the one of the subject images.

The corresponding feature point detection process as described above is generally performed by searching an entire area of the image data obtained by imaging the other one of the subject images. However, the search for the entire area of the image data requires a long processing time and thus a processing time for the corresponding feature point detection process becomes long. As a result, there is a problem that a processing time for calculating the distance to the subject based on the image magnification ratio between the subject images becomes long.

RELATED ART DOCUMENT

Patent Documents

JP 2012-26841A
JP 2017-241896

Problem to be Solved by the Invention

The present invention has been made in view of the above-mentioned problem of the conventional art. Accordingly, it is an object of the present invention to provide a distance measuring camera which can reduce a processing time for calculating a distance to a subject based on an image magnification ratio between subject images by performing search for a plurality of feature points with an epipolar line based on an epipolar geometry in a corresponding feature point detection process for detecting the plurality of feature points of one of the subject images respectively corresponding to a plurality of feature points of the other one of the subject images.

Means for Solving the Problems

This object is achieved by the present inventions as defined in the following (1) to (7).

(1) A distance measuring camera, comprising:
a first imaging system including a first optical system for collecting light from a subject to form a first subject image and a first image sensor for imaging the first subject image to obtain a first image containing the first subject image;
a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image;
a size obtaining part for detecting a plurality of feature points of the first subject image in the first image and measuring a distance between the plurality of feature points of the first subject image to obtain a size of the first subject image and detecting a plurality of feature points of the second subject image in the second image respectively corresponding to the plurality of feature points of the first subject image and measuring a distance between the plurality of feature points of the second subject image to obtain a size of the second subject image; and
a distance calculating part for calculating a distance to the subject based on an image magnification ratio between a magnification of the first subject image and a magnification of the second subject image which is obtained as a ratio between the size of the first subject image and the size of the second subject image obtained by the size obtaining part,
wherein the size obtaining part detects the plurality of feature points of the second subject image in the second image by searching pixels on a plurality of epipolar lines in the second image respectively corresponding to the plurality of feature points of the first subject image.

(2) The distance measuring camera according to the above (1), wherein the size obtaining part derives the plurality of epipolar lines in the second image respectively corresponding to the plurality of feature points of the first subject image based on a model in which characteristics and arrangements of the first imaging system and the second imaging system are taken into consideration.

(3) The distance measuring camera according to the above (2), wherein each of the epipolar lines in the second image respectively corresponding to the plurality of feature points of the first subject image is represented by the following equation (1).

$$yv_2 = \frac{(G_1 G_6 - G_2 G_5) xu_2 + G_3 G_6 - G_4 G_5}{G_1 G_4 - G_2 G_3} \quad (1)$$

where
$$\begin{cases} G_1 = EP_2 L_1 (R_{32} yv_1 + R_{31} xu_1) + K_1 (EP_2 D + L_2) \\ G_2 = EP_1 EP_2 (R_{32} yv_1 + R_{31} xu_1) + EP_2 K_1 R_{33} \\ G_3 = -K_2 L_1 (R_{12} yv_1 + R_{11} xu_1) + K_1 K_2 P_x \\ G_4 = -K_2 EP_1 (R_{12} yv_1 + R_{11} xu_1) - K_1 K_2 R_{13} \\ G_5 = -K_2 L_1 (R_{22} yv_1 + R_{21} xu_1) + K_1 K_2 P_y \\ G_6 = K_2 EP_1 (R_{22} yv_1 + R_{21} xu_1) - K_1 K_2 R_{23} \\ \\ xu_1 = x_1 - u_1 \\ yv_1 = y_1 - v_1 \\ xu_2 = x_2 - u_2 \\ yv_2 = y_2 - v_2 \\ \\ K_1 = \frac{f_1 \cdot (f_1^2 - EP_1 \cdot f_1 + EP_1 \cdot a_{FD1})}{PS_1 \cdot (a_{FD1} - f_1)} \\ K_2 = \frac{f_2 \cdot (f_2^2 - EP_2 \cdot f_2 + EP_2 \cdot a_{FD2})}{PS_2 \cdot (a_{FD2} - f_2)} \\ L_1 = f_1^2 - EP_1 \cdot f_1 \\ L_2 = f_2^2 - EP_2 \cdot f_2 \end{cases}$$

where "$x_1$" and "$y_1$" are respectively x and y coordinates of arbitrary one of the plurality of feature points of the first subject image in the first image, "$x_2$" and "$y_2$" are respectively x and y coordinates of a feature point of the second subject image in the second image corresponding to the arbitrary one of the plurality of feature points of the first subject image, "$P_x$" and "$P_y$" are respectively values in x and y directions of a parallel disparity between a front principal point of the first optical system and a front principal point of the second optical system, "D" is a depth disparity in the optical axis direction of the first optical system or the second optical system between the first optical system and the second optical system, "$PS_1$" is a pixel size of the first image sensor, "$PS_2$" is a pixel size of the second image sensor, "$f_1$" is a focal length of the first optical system, "$f_2$" is a focal length of the second optical system, "$EP_1$" is a distance from an exit pupil of the first optical system to an image formation position of the first subject image when the subject is located at an infinite distance point, "$EP_2$" is a distance from an exit pupil of the second optical system to an image formation position of the second subject image when the subject is located at the infinite distance point, "$a_{FD1}$" is a distance from the front principal point of the first optical system to the subject when the first subject image is in best focus on an imaging surface of the first image sensor, "$a_{FD2}$" is a distance from the front principal point of the second optical system to the subject when the second subject image is in the best focus on an imaging surface of the second image sensor, "$u_1$" and "$v_1$" are respectively x and y coordinates of an optical axis of the first optical system in the first image, "$u_2$" and "$v_2$" are respectively x and y coordinates of an optical axis of the second optical system in the second image, and "$R_{11}$", "$R_{12}$", "$R_{13}$", "$R_{21}$", "$R_{22}$", "$R_{23}$", "$R_{31}$", "$R_{32}$" and "$R_{33}$" are components of a rotation matrix of the second imaging system with respect to the first imaging system.

(4) The distance measuring camera according to the above (1), wherein the first optical system and the second optical system are configured so that a change of the magnification of the first subject image according to the distance to the subject is different from a change of the magnification of the second subject image according to the distance to the subject.

(5) The distance measuring camera according to the above (4), wherein the first optical system and the second optical system are configured so that a focal length of the first optical system and a focal length of the second optical system are different from each other, and thereby the change of the magnification of the first subject image according to the distance to the subject is different from the change of the magnification of the second subject image according to the distance to the subject.

(6) The distance measuring camera according to the above (4) or (5), wherein the first optical system and the second optical system are configured so that a distance from an exit pupil of the first optical system to an image formation position of the first subject image formed by the first optical system when the subject is located at an infinite distance point is different from a distance from an exit pupil of the second optical system to an image formation position of the second subject image formed by the second optical system when the subject is located at the infinite distance point, and thereby the change of the magnification of the first subject image according to the distance to the subject is different from the change of the magnification of the second subject image according to the distance to the subject.

(7) The distance measuring camera according to any one of the above (4) to (6), wherein a depth disparity in the optical axis direction of the first optical system or the second optical system exists between a front principal point of the first optical system and a front principal point of the second optical system, and thereby the change of the magnification of the first subject image according to the distance to the subject is different from the change of the magnification of the second subject image according to the distance to the subject.

Effects of the Invention

The distance measuring camera of the present invention performs the search for the plurality of feature points with the epipolar line based on the epipolar geometry in a corresponding feature point detection process for detecting the plurality of feature points of one of the subject images respectively corresponding to the plurality of feature points of the other one of the subject images. Therefore, it is possible to reduce a processing time for calculating the distance to the subject based on the image magnification ratio between the subject images.

DETAILED DESCRIPTION

Figure 1:
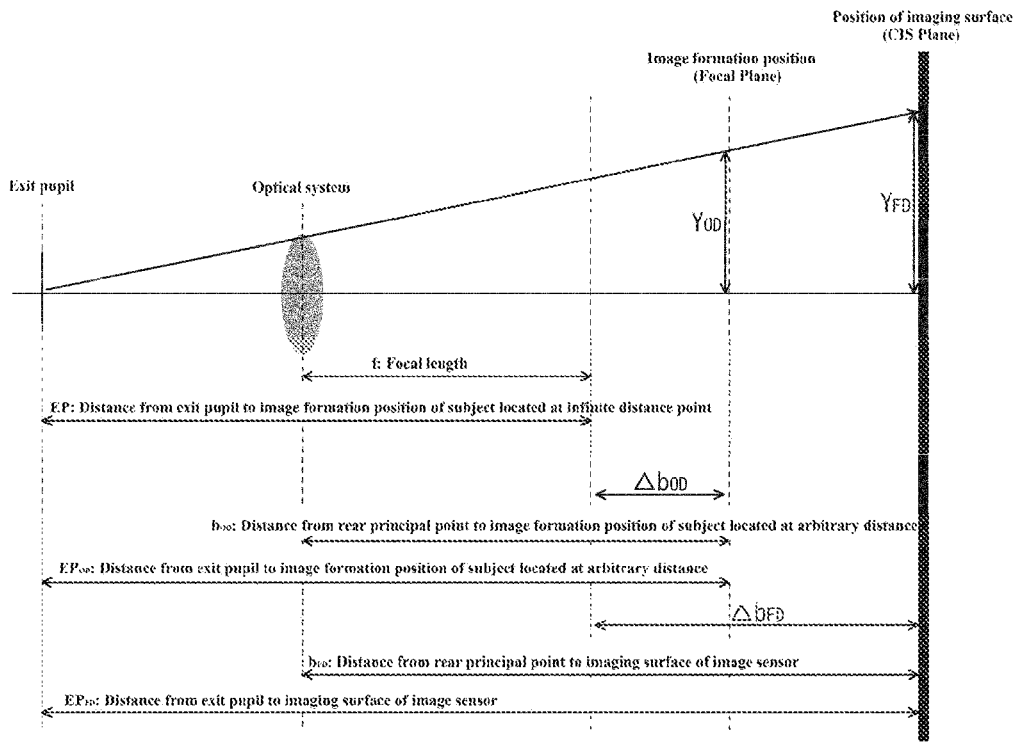
FIG. 1 is a view for explaining a distance measuring principle of a distance measuring camera of the present invention.

First, description will be given to a distance measurement principle for calculating a distance to a subject based on an image magnification ratio between subject images used in a distance measuring camera of the present invention. In the drawings, components providing same or similar functions are denoted by the same reference numerals.

A magnification "$m_{OD}$" of a subject image formed by an optical system can be calculated from a distance (subject distance) "a" from a front principal point (front principal plane) of the optical system to a subject, a distance "$b_{OD}$" from a rear principal point (rear principal plane) of the optical system to an image formation position of the subject image and a focal length "f" of the optical system according to the following equation (1) derived from the lens equation.

[Equation 1]

$$m_{OD} = \frac{b_{OD}}{a} = \frac{f}{a-f} \qquad (1)$$

Further, a size "$Y_{OD}$" of the subject image can be calculated from the magnification "$m_{OD}$" of the subject image and an actual size "sz" of the subject according to the following equation (2).

[Equation 2]

$$Y_{OD} = sz \cdot m_{OD} = \frac{sz \cdot f}{a-f} \qquad (2)$$

When an imaging surface of an image sensor (imaging element) is located at the image formation position of the subject image, that is, when the subject image is in the best focus, the size "$Y_{OD}$" of the subject image can be calculated by the above equation (2). When the optical system has an autofocus function and always images the subject with the best focus, the size "$Y_{OD}$" of the subject image can be calculated by the above equation (2).

However, when the optical system is a fixed focus system having no autofocus function and the imaging surface of the image sensor (imaging element) is not located at the image formation position of the subject image, that is, when defocus is present, it is required to consider a defocus amount, that is, a difference (shift amount) between the image formation position of the subject image and a position of the imaging surface of the image sensor in a depth direction (optical axis direction) in order to obtain a size "$Y_{FD}$" of the subject image formed on the imaging surface of the image sensor.

As shown in FIG. 1, a distance from an exit pupil of the optical system to an image formation position of the subject image when the subject is located at an infinite distance point is defined as "EP", a distance from the exit pupil of the optical system to an image formation position of the subject image when the subject is located at an arbitrary distance "a" is defined as "$EP_{OD}$" and a distance (Focus Distance) from the exit pupil of the optical system to the imaging surface of the image sensor is defined as "$EP_{FD}$". Further, a distance from the rear principal point of the optical system to the image formation position of the subject image when the subject is located at the arbitrary distance "a" is defined as "$b_{OD}$" and a distance from the rear principal point of the optical system to the imaging surface of the image sensor is defined as "$b_{FD}$". In the illustrated aspect, for the sake of simplicity of description, the optical system is schematically illustrated so that the rear principal point of the optical system is located at a center position of the optical system.

The distance "$b_{OD}$" from the rear principal point of the optical system to the image formation position of the subject image when the subject is located at the arbitrary distance "a" can be calculated according to the following equation (3) derived from the lens equation.

[Equation 3]

$$b_{OD} = \frac{1}{1/f - 1/a} = \frac{a \cdot f}{a - f} \quad (3)$$

Therefore, a difference "$\Delta b_{OD}$" between the focal length "f" and the distance "$b_{OD}$" can be calculated according to the following equation (4).

[Equation 4]

$$\Delta b_{OD} = b_{OD} - f = \frac{a \cdot f}{a - f} - f = \frac{f^2}{a - f} \quad (4)$$

Further, the distance "$b_{FD}$" from the rear principal point of the optical system to the imaging surface of the image sensor can be calculated from a distance "$a_{FD}$" from the front principal point of the optical system to the subject when the subject image is in the best focus on the imaging surface of the image sensor according to the following equation (5) derived from the lens equation.

[Equation 5]

$$b_{FD} = \frac{1}{1/f - 1/a_{FD}} = \frac{a_{FD} \cdot f}{a_{FD} - f} \quad (5)$$

Therefore, a difference "$\Delta b_{FD}$" between the focal length "f" and the distance "$b_{FD}$" can be calculated according to the following equation (6).

[Equation 6]

$$\Delta b_{FD} = b_{FD} - f = \frac{a_{FD} \cdot f}{a_{FD} - f} - f = \frac{f^2}{a_{FD} - f} \quad (6)$$

Further, as is clear from FIG. 1, a right-angled triangle having one vertex at the intersection of the optical axis and the exit pupil of the optical system and one side which is the size "$Y_{OD}$" of the subject image at the image formation position of the subject image when the subject is located at the arbitrary distance "a" is similar to a right-angled triangle having one vertex at the intersection of the optical axis and the exit pupil of the optical system and one side which is the size "$Y_{FD}$" of the subject image on the imaging surface of the image sensor. Therefore, "$EP_{OD}:EP_{FD}$"="$Y_{OD}:Y_{FD}$" is satisfied from the similarity relationship and the size "$Y_{FD}$" of the subject image on the imaging surface of the image sensor can be calculated according to the following equation (7).

[Equation 7]

$$EP_{OD}:EP_{FD} = Y_{OD}:Y_{FD} \quad (7)$$
$$EP + \Delta b_{OD}:EP + \Delta b_{FD} = Y_{OD}:Y_{FD}$$
$$Y_{FD} = \frac{EP + \Delta b_{FD}}{EP + \Delta b_{OD}} \cdot Y_{OD} = \left( \frac{f^2 - EP \cdot f +}{EP \cdot a_{FD}} \middle/ \frac{f^2 - EP \cdot f +}{a_{FD} - f} \frac{EP \cdot a}{a - f} \right) \cdot \frac{sz \cdot f}{a - f} =$$
$$\frac{sz \cdot f \cdot \left( \frac{f^2 - EP \cdot f +}{EP \cdot a_{FD}} \right)}{(a_{FD} - f) \cdot \left( \frac{f^2 - EP \cdot f +}{EP \cdot a} \right)}$$

As is clear from the above equation (7), the size "$Y_{FD}$" of the subject image on the imaging surface of the image sensor can be expressed as a function of the actual size "sz" of the subject, the focal length "f" of the optical system, the distance "EP" from the exit pupil of the optical system to the image formation position of the subject image when the subject is located at the infinite distance point, the distance (subject distance) "a" from the exit pupil of the optical system to the subject and the distance (Focus Distance) "$a_{FD}$" from the exit pupil of the optical system to the subject when the subject image is in the best focus on the imaging surface of the image sensor.

Figure 2:
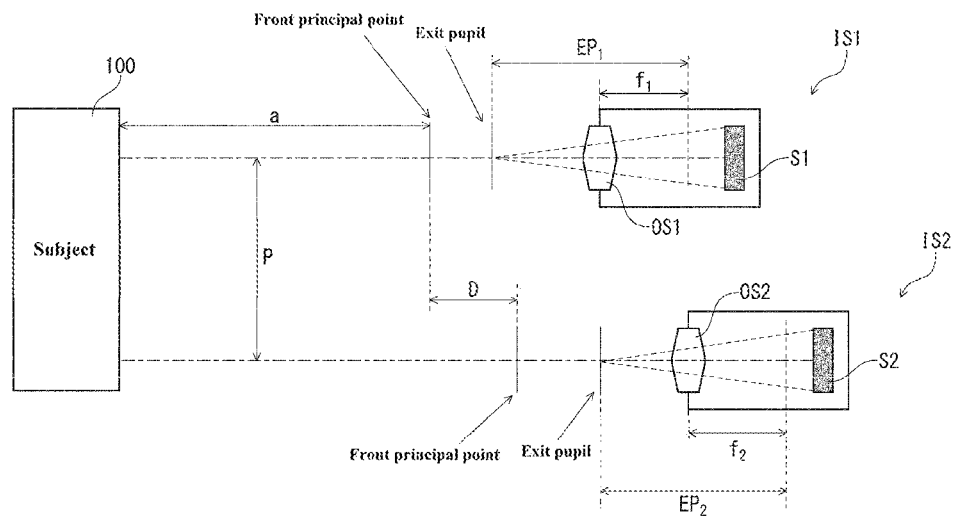
FIG. 2 is another view for explaining the distance measuring principle of the distance measuring camera of the present invention.

Next, it is assumed that one subject 100 is imaged by using two imaging systems IS1, IS2 as shown in FIG. 2. The first imaging system IS1 includes a first optical system OS1 for collecting light from the subject 100 to form a first subject image and a first image sensor S1 for imaging the first subject image formed by the first optical system OS1. The second imaging system IS2 includes a second optical system OS2 for collecting the light from the subject 100 to form a second subject image and a second image sensor S2 for imaging the second subject image formed by the second optical system OS2. In this regard, a pixel size (a size per one pixel) of the first image sensor S1 is "$PS_1$" and a pixel size of the second image sensor S2 is "$PS_2$".

Further, as is clear from FIG. 2, although an optical axis of the first optical system OS1 of the first imaging system IS1 and an optical axis of the second optical system OS2 of the second imaging system IS2 are parallel to each other, the optical axis of the first optical system OS1 and the optical axis of the second optical system OS2 do not coincide with each other. Further, the second optical system OS2 is arranged so as to be shifted from the first optical system OS1 by a distance "P" in a direction perpendicular to an optical axis direction of the first optical system OS1.

Although the optical axis of the first optical system OS1 and the optical axis of the second optical system OS2 are parallel to each other in the illustrated aspect, the present invention is not limited thereto. For example, the first optical system OS1 and the second optical system OS2 may be arranged so that an angle of the optical axis of the first optical system OS1 (angular parameters θ and φ of the three-dimensional polar coordinate) and an angle of the optical axis of the second optical system OS2 are different from each other. However, for the sake of simplicity of description, it is assumed that the first optical system OS1 and the second optical system OS2 are arranged so that the optical axis of the first optical system OS1 and the optical axis of the second optical system OS2 are parallel to each other but do not coincide with each other with being spaced apart from each other by the distance "P" as shown in FIG. 2.

The first optical system OS1 and the second optical system OS2 are fixed-focus optical systems each having different focal lengths "$f_1$" and "$f_2$". When the first imaging system IS1 is configured, a position (lens position) of the first optical system OS1, that is, a separation distance between the first optical system OS1 and the first image sensor S1 is adjusted so that the first subject image of the subject 100 which is located at an arbitrary distance (focus distance) "$a_{FD1}$" is formed on an imaging surface of the first image sensor S1, that is, the subject 100 which is located at the arbitrary distance "$a_{FD1}$" is in the best focus. Similarly, when the second imaging system IS2 is configured, a position (lens position) of the second optical system OS2, that is, a separation distance between the second optical system OS2 and the second image sensor S2 is adjusted so that the second subject image of the subject 100 which is located at an arbitrary distance (focus distance) "$a_{FD2}$" is formed on an imaging surface of the second image sensor S2, that is, the subject 100 which is located at the arbitrary distance "$a_{FD2}$" is in the best focus.

Further, a distance from an exit pupil of the first optical system OS1 to an image formation position of the first subject image when the subject 100 is located at the infinite distance point is "$EP_1$" and a distance from an exit pupil of the second optical system OS2 to an image formation position of the second subject image when the subject 100 is located at the infinite distance point is "$EP_2$".

The first optical system OS1 and the second optical system OS2 are configured and arranged so that a distance (depth disparity) "D" in the depth direction (optical axis direction) exists between a front principal point (front principal plane) of the first optical system OS1 and a front principal point (front principal plane) of the second optical system OS2. Namely, when a distance (subject distance) from the front principal point of the first optical system OS1 to the subject 100 is defined as "a", a distance from the front principal point of the second optical system OS2 to the subject 100 is "a+D".

By using the similarity relationship described with reference to FIG. 1, a magnification "$m_1$" of the first subject image formed on the imaging surface of the first image sensor S1 by the first optical system OS1 can be calculated according to the following equation (8).

[Equation 8]

$$m_1 = \frac{EP_{FD1}}{EP_{OD1}} \cdot m_{OD1} = \frac{EP_1 + \Delta b_{FD1}}{EP_1 + \Delta b_{OD1}} \cdot m_{OD1} \quad (8)$$

Here, "$EP_{OD1}$" is a distance from the exit pupil of the first optical system OS1 to an image formation position of the first subject image when the subject 100 is located at the distance "a". "$EP_{FD1}$" is a distance from the exit pupil of the first optical system OS1 to the imaging surface of the first image sensor S1. A positional relationship between the distance "$EP_{OD1}$" and the distance "$EP_{FD1}$" is determined at the time of configuring the first imaging system IS1 by adjusting the position (lens position) of the first optical system OS1 so that the subject 100 located at the distance "$a_{FD1}$" is in the best focus. Further, "$\Delta b_{OD1}$" is a difference between the focal length "$f_1$" and a distance "$b_{OD1}$" from a rear principal point of the first optical system OS1 to the image formation position of the first subject image when the subject 100 is located at the distance "a". "$\Delta b_{FD1}$" is a difference between the focal length "$f_1$" and a distance "$b_{FD1}$" from the rear principal point of the first optical system OS1 to the imaging surface of the first image sensor S1. "$m_{OD1}$" is a magnification of the first subject image at the image formation position of the first subject image when the subject 100 is located at the distance "a".

Since the above equations (1), (4) and (6) can be applied to the image formation by the first optical system OS1, the above equation (8) can be expressed by the following equation (9).

[Equation 9]

$$m_1 = \left( \frac{f_1^2 - EP_1 \cdot f_1 +}{a_{FD1} - f_1} \bigg/ \frac{f_1^2 - EP_1 \cdot f_1 +}{a - f_1} \right) \cdot \frac{f_1}{a - f_1} = \frac{f_1 \cdot \left( \frac{f_1^2 - EP_1 \cdot f_1 +}{EP_1 \cdot a_{FD1}} \right)}{(a_{FD1} - f_1) \cdot \left( \frac{f_1^2 - EP_1 \cdot f_1 +}{EP_1 \cdot a} \right)} \quad (9)$$

Here, "$a_{FD1}$" is the distance from the front principal point of the first optical system OS1 to the subject 100 when the first subject image is in the best focus on the imaging surface of the first image sensor S1.

Similarly, a magnification "$m_2$" of the second subject image formed on the imaging surface of the second image sensor S2 by the second optical system OS2 can be calculated according to the following equation (10).

[Equation 10]

$$m_2 = \frac{EP_{FD2}}{EP_{OD2}} \cdot m_{OD2} = \frac{EP_2 + \Delta b_{FD2}}{EP_2 + \Delta b_{OD2}} \cdot m_{OD2} = \qquad (10)$$

$$\left( \frac{f_2^2 - EP_2 \cdot f_2 + \ EP_2 \cdot a_{FD2}}{a_{FD2} - f_2} / \frac{f_2^2 - EP_2 \cdot f_2 + \ EP_2 \cdot (a+D)}{(a+D) - f_2} \right) \cdot \frac{f_2}{(a+D) - f_2} =$$

$$\frac{f_2 \cdot \left( \frac{f_2^2 - EP_2 \cdot f_2 +}{EP_2 \cdot a_{FD2}} \right)}{(a_{FD2} - f_2) \cdot \left( \frac{f_2^2 - EP_2 \cdot f_2 +}{EP_2 \cdot (a+D)} \right)}$$

Here, "$EP_{OD2}$" is a distance from the exit pupil of the second optical system OS2 to an image formation position of the second subject image when the subject 100 is located at the distance "a+D". "$EP_{FD2}$" is a distance from the exit pupil of the second optical system OS2 to the imaging surface of the second image sensor S2. A positional relationship between the distance "$EP_{OD2}$" and the distance "$EP_{FD2}$" is determined at the time of configuring the second imaging system IS2 by adjusting the position (lens position) of the second optical system OS2 so that the subject 100 located at the arbitrary distance "$a_{FD2}$" is in the best focus. In addition, "$\Delta b_{OD2}$" is a difference between the focal length "f2" and a distance "$b_{OD2}$" from the rear principal point of the second optical system OS2 to the image formation position of the second subject image when the subject 100 is located at the distance "a+D". "$\Delta b_{FD2}$" is a difference between the focal length "$f_2$" and a distance "$b_{FD2}$" from the rear principal point of the second optical system OS2 to the imaging surface of the second image sensor S2. "$m_{OD2}$" is a magnification of the second subject image at the image formation position of the second subject image when the subject 100 is located at the distance "a+D". "$a_{FD2}$" is the distance from the front principal point of the second optical system OS2 to the subject 100 when the second subject image is in the best focus on the imaging surface of the second image sensor S2.

Therefore, an image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 can be calculated according to the following equation (11).

[Equation 11]

$$MR = \frac{m_2}{m_1} = \frac{f_2}{f_1} \cdot \frac{a_{FD1} - f_1}{a_{FD2} - f_2} \cdot \qquad (11)$$

$$\frac{f_2^2 - EP_2 \cdot f_2 + EP_2 \cdot a_{FD2}}{f_1^2 - EP_1 \cdot f_1 + EP_1 \cdot a_{FD1}} \cdot \frac{f_1^2 - EP_1 \cdot f_1 + EP_1 \cdot a}{f_2^2 - EP_2 \cdot f_2 + EP_2 \cdot (a+D)} =$$

$$K \cdot \frac{f_1^2 - EP_1 \cdot f_1 + EP_1 \cdot a}{f_2^2 - EP_2 \cdot f_2 + EP_2 \cdot (a+D)}$$

Here, "K" is a coefficient and represented by the following equation (12) constituted of the fixed values "$f_1$", "$f_2$", "$EP_1$", "$EP_2$", "$a_{FD1}$" and "$a_{FD2}$" determined by the configurations of the first imaging system IS1 and the second imaging system IS2.

[Equation 12]

$$K = \frac{f_2}{f_1} \cdot \frac{a_{FD1} - f_1}{a_{FD2} - f_2} \cdot \frac{f_2^2 - EP_2 \cdot f_2 + EP_2 \cdot a_{FD2}}{f_1^2 - EP_1 \cdot f_1 + EP_1 \cdot a_{FD1}} \qquad (12)$$

As is clear from the above equation (11), the image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 changes according to the distance "a" from the front principal point of the first optical system OS1 to the subject 100.

By solving the above equation (11) for the distance "a", the following general equation (13) for the distance "a" to the subject 100 can be obtained.

[Equation 13]

$$a = \frac{K \cdot (f_1^2 - EP_1 \cdot f_1) - MR \cdot (f_2^2 - EP_2 \cdot f_2 + EP_2 \cdot D)}{MR \cdot EP_2 - K \cdot EP_1} \qquad (13)$$

In the above equation (13), "$f_1$", "$f_2$", "$EP_1$", "$EP_2$", "D" and "K" are the fixed values determined by the configurations of the first imaging system IS1 and the second imaging system IS2. Thus, if the image magnification ratio "MR" can be obtained, it is possible to calculate the distance "a" from the front principal point of the first optical system OS1 to the subject 100.

Figure 3:
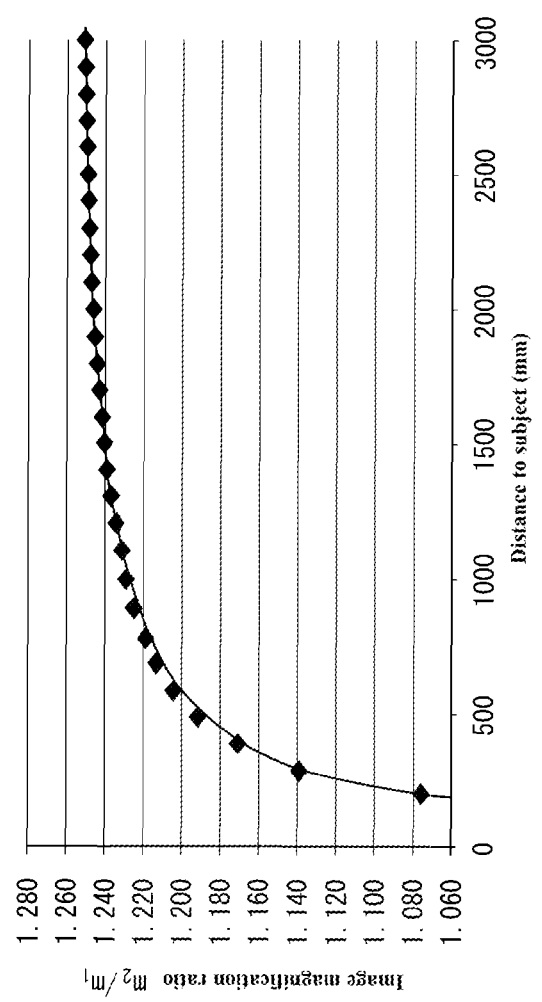
FIG. 3 is a graph for explaining that an image magnification ratio between a magnification of a first subject image formed by a first optical system shown in FIG. 2 and a magnification of a second subject image formed by a second optical system shown in FIG. 2 changes according to a distance to a subject.

FIG. 3 shows an exemplary relationship between the image magnification ratio "MR" of the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 and the distance "a" to the subject 100, which is derived from the above equation (13). As is clear from FIG. 3, one-to-one relationship is established between the value of the image magnification ratio "MR" and the distance "a" to the subject 100.

On the other hand, the image magnification ratio "MR" can be calculated according to the following equation (14).

[Equation 14]

$$MR = \frac{m_2}{m_1} = \frac{Y_{FD2}/sz}{Y_{FD1}/sz} = \frac{Y_{FD2}}{Y_{FD1}} \qquad (14)$$

Here, "sz" is an actual size (height or width) of the subject 100, "$Y_{FD1}$" is a size (image height or image width) of the first subject image formed on the imaging surface of the first image sensor S1 by the first optical system OS1 and "$Y_{FD2}$" is a size (image height or image width) of the second subject image formed on the imaging surface of the second image sensor S2 by the second optical system OS2.

The size "$Y_{FD1}$" of the first subject image can be actually measured from a first image (first image data) obtained by imaging the first subject image with the first image sensor S1. Similarly, the size "$Y_{FD2}$" of the second subject image can be actually measured from a second image (second image data) obtained by imaging the second subject image with the second image sensor S2.

Specifically, the size "$Y_{FD1}$" of the first subject image is obtained by detecting a plurality of feature points (for example, both edge portions in a height direction or a width direction) of the first subject image contained in the first image and measuring a distance between the plurality of detected feature points. On the other hand, the size "$Y_{FD2}$" of the second subject image is obtained by detecting a plurality of feature points of the second subject image in the second image respectively corresponding to the plurality of detected feature points of the first subject image and measuring a distance between the plurality of detected corresponding feature points. In the following description, a process for detecting the plurality of feature points of the second subject image in the second image respectively corresponding to the plurality of detected feature points of the first subject image is referred to as "a corresponding feature point detection process". The distance measuring camera of the present invention uses an epipolar line based on an epipolar geometry in the corresponding feature point detection process to largely reduce a processing time for the corresponding feature point detection process.

Figure 4:
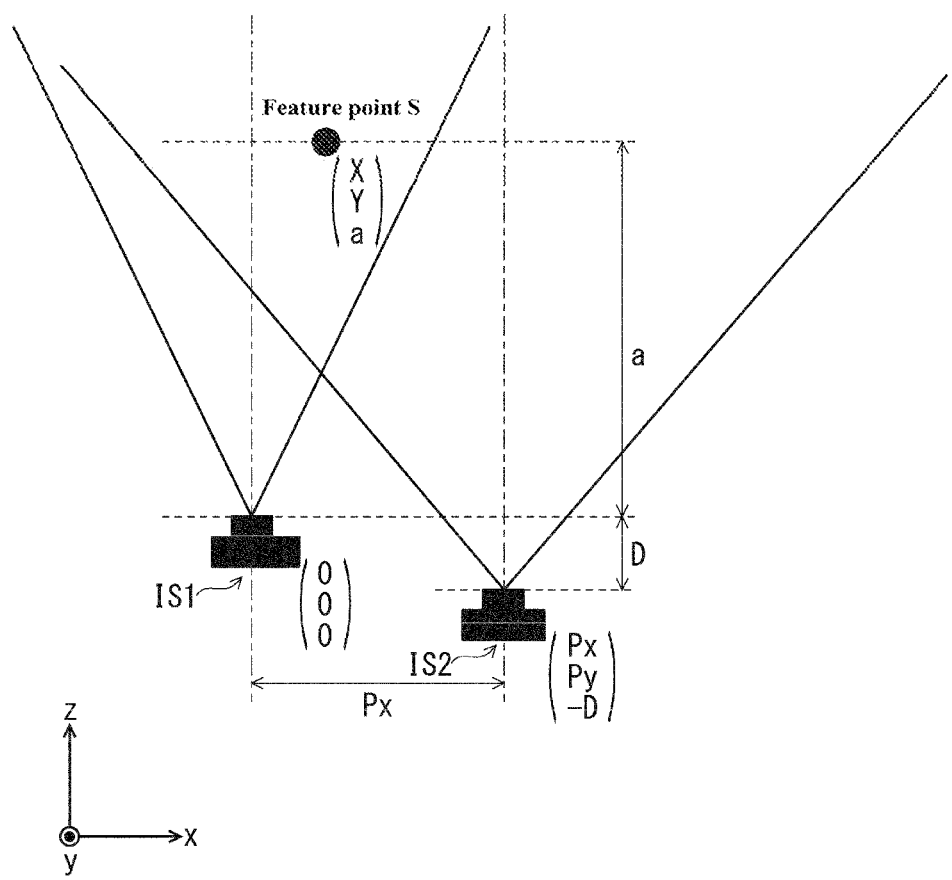
FIG. 4 is an X-Z plan view illustrating a model for deriving an epipolar line used in the distance measuring camera of the present invention.
Figure 5:
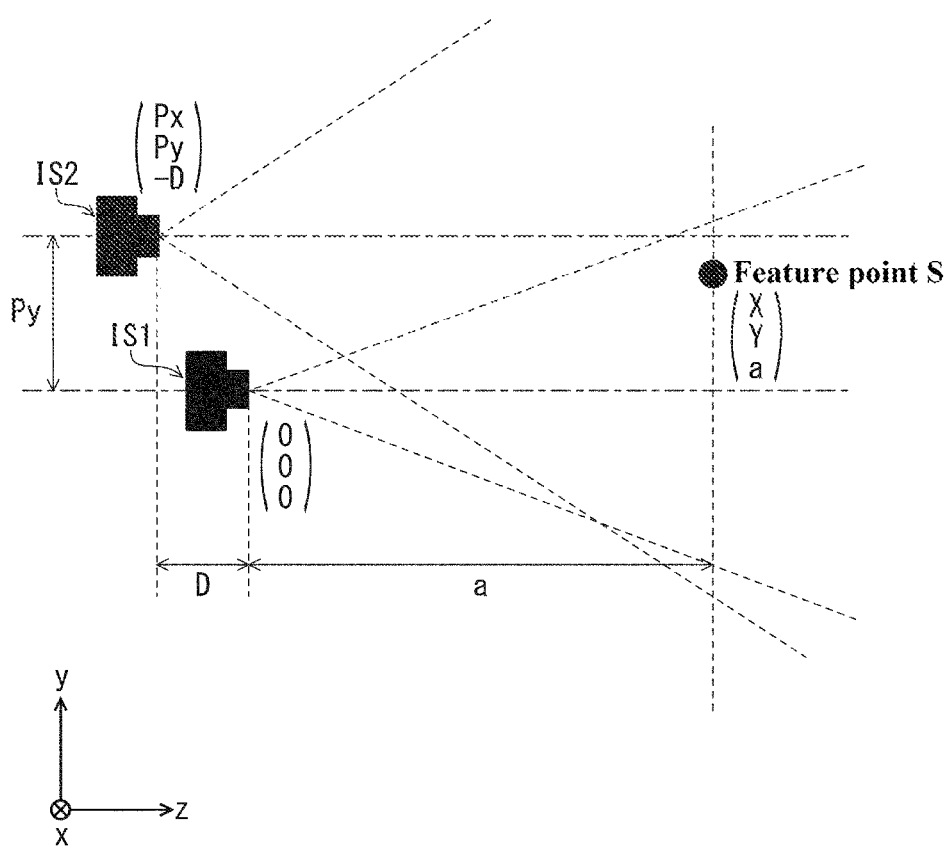
FIG. 5 is a Y-Z plan view illustrating the model for deriving the epipolar line used in the distance measuring camera of the present invention.

FIGS. 4 and 5 show a model for deriving the epipolar line used in the distance measuring camera of the present invention. FIG. 4 is an X-Z plan view illustrating arrangements of the first imaging system IS1 and the second imaging system IS2 in the model for deriving the epipolar line. FIG. 5 is a Y-Z plan view illustrating the arrangements of the first imaging system IS1 and the second imaging system IS2 in the model for deriving the epipolar line.

The first imaging system IS1 and the second imaging system IS2 are arranged so that the optical axis of the first optical system OS1 of the first imaging system IS1 and the optical axis of the second optical system OS2 of the second imaging system IS2 do not coincide with each other as shown in FIGS. 4 and 5. Thus, a parallel disparity exits between the first subject image formed by the first optical system OS1 and the second subject image formed by the second optical system OS2. In the distance measuring camera of the present invention, the image magnification ratio "MR" which is a ratio between the magnification "$m_1$" of the first subject image and the magnification "$m_2$" of the second subject image is used for calculating the distance "a" to the subject 100 and the parallel disparity between the first subject image and the second subject image is not used for calculating the distance "a" to the subject 100. However, since the parallel disparity exists between the first subject image and the second subject image, the principle of the epipolar line based on the epipolar geometry as used in the stereo camera type distance measuring camera can be also applied to the first subject image and the second subject image obtained by the distance measuring camera of the present invention.

Generally, it is often to use a pinhole model in which only arrangements (parameters "$P_x$", "$P_y$" and "D" related to the disparity) of the first imaging system IS1 and the second imaging system IS2 are taken into consideration and characteristics (the above-described parameters "$f_1$", "$f_2$", "$EP_1$", "$EP_2$", "$a_{FD1}$", "$a_{FD2}$", "$PS_1$", "$PS_2$") of the first imaging system IS1 and the second imaging system IS2 are not taken into the consideration as a model for deriving the epipolar line. However, the first imaging system IS1 and the second imaging system IS2 actually used have many factors related to the imaging such as the first optical system OS1, the second optical system OS2, the first image sensor S1 and the second image sensor S2 and the like. Therefore, a deviation occurs between the pinhole model ignoring these factors and the real and thus the epipolar line cannot be accurately derived. On the other hand, the distance measuring camera of the present embodiment uses a model in which the characteristics and the arrangements of the first imaging system IS1 and the second imaging system IS2 shown in FIGS. 4 and 5 are taken into consideration in order to derive the epipolar line. Thus, the distance measuring camera of the present invention can accurately derive the epipolar line. As described with reference to FIG. 2, the characteristics and the arrangements of the first imaging system IS1 and the second imaging system IS2 in the model shown in FIGS. 4 and 5 are indicated in the following table.

TABLE 1

| Characterictis of imaging system | IS1 | IS2 | Arrangement of imagins sysmte | Disparity [mm] | Angle [deg] |
|---|---|---|---|---|---|
| Focal length [mm] | $f_1$ | $f_2$ | X axis | $P_x$ | $\theta_x$ |
| Position of exit pupil [mm] | $EP_1$ | $EP_2$ | Y axis | $P_y$ | $\theta_y$ |
| Pixel size [mm] | $PS_1$ | $PS_2$ | Z axis | D | $\theta_z$ |
| Focus distance [mm] | $a_{FD1}$ | $a_{FD2}$ | | | |
| Position of optical axis (x coordinate, y coordinate) | $(u_1, v_1)$ | $(u_2, v_2)$ | | | |

In the model shown in FIGS. 4 and 5, a coordinate of the front principal point of the first optical system OS1 of the first imaging system IS1 is set as an origin (0, 0, 0) and a coordinate of the front principal point of the second optical system OS2 of the second imaging system IS2 is ($P_x$, $P_y$, −D). Thus, the distance "P" between the optical axis of the first optical system OS1 and the optical axis of the second optical system OS2 in the direction perpendicular to the optical axis direction of the first optical system OS1 or the second optical system OS2 is expressed as "$P=(P_x^2+P_y^2)^{1/2}$". In this regard, the distance "$P_x$" in the x axis direction between the front principal point of the first optical system OS1 and the front principal point of the second optical system OS2 is referred to as "a parallel disparity in the x axis direction" and the separation distance "$P_y$" in the y-axis direction between the front principal point of the first optical system OS1 and the front principal point of the second optical system OS2 in the y axis direction is referred to as "a parallel disparity in the y axis direction". Further, the distance "D" in the z axis direction between the front principal point of the first optical system OS1 and the front principal point of the second optical system OS2 is referred to as "a depth disparity". Rotations around the x axis, y axis, and z axis of the second imaging system IS2 with respect to the first imaging system IS1 are respectively defined as "$\theta_x$", "$\theta_x$" and "$\theta_z$".

Further, in the first imaging system IS1, the optical axis of the first optical system OS1 should be located at a center of the imaging surface of the first image sensor S1, ideally. However, due to factors such as errors and inaccuracy at the time of assembling the first imaging system IS1, the optical axis of the first optical system OS1 may not be located at the center of the imaging surface of the first image sensor S1. In this case, the optical axis of the first optical system OS1 is not located at a center of the first image, that is at an origin (0, 0) of the first image obtained by the first imaging system IS1. The position of the optical axis $(u_1, v_1)$ in the characteristics of the first imaging system IS1 shown in the table 1 represents a x-coordinate and a y-coordinate of the position of the optical axis of the first optical system OS1 in the first image. Similarly, the position of the optical axis $(u_2, v_2)$ in the characteristics of the second imaging system IS2 shown in the table 1 represents a x-coordinate and a y-coordinate of the position of the optical axis of the second optical system OS2 in the second image. In the model used for deriving the epipolar line, these shift amounts of the optical axes of the first optical system OS1 and the second optical system OS2 are taken into consideration. Therefore, it becomes possible to more accurately derive the epipolar line.

In the model described above it is assumed that a feature point S of the subject 100 located at a coordinate (X, Y, a) is imaged by the first imaging system IS1 and the second imaging system IS2. At this time, a coordinate of the feature point S in the first image obtained by the first imaging system IS1 is defined as $(x_1, y_1)$ and a coordinate of the feature point S in the second image obtained by the second imaging system IS2 is defined as $(x_2, y_2)$.

In this regard, a coordinate in which an arbitrary reference point is set as the origin is referred to as "a world coordinate", a coordinate in which the front principal point of the first optical system OS1 of the first imaging system IS1 is set as the origin is referred to as "a camera coordinate of the first imaging system IS1" and a coordinate in which the front principal point of the second optical system OS2 of the second imaging system IS2 is set as the origin is referred to as "a camera coordinate of the second imaging system IS2". Further, a coordinate in the first image (for example, $(x_1, y_1)$) is referred to as "an image coordinate of the first image" and a coordinate in the second image (for example, $(x_2, y_2)$) is referred to as "an image coordinate of the second image". In the model shown in FIGS. 4 and 5, the origin of the world coordinate is the front principal point of the first optical system OS1 of the first imaging system IS1. Thus, in the model shown in FIGS. 4 and 5, the origin of the world coordinate matches the origin of the camera coordinate of the first imaging system IS1.

The world coordinate can be converted into a camera coordinate by an external matrix of an imaging system. Further, the camera coordinate can be converted into an image coordinate by an internal matrix of the imaging system. Thus, the world coordinate (X, Y, a) of the feature point S can be converted into the image coordinate $(x_1, y_1)$ of the first image by an external matrix and an internal matrix of the first imaging system IS1. Similarly, the world coordinate (X, Y, a) of the feature point S can be converted into the image coordinate $(x_2, y_2)$ of the second image by an external matrix and an internal matrix of the second imaging system IS2.

First, discussion is given to the image coordinate $(x_1, y_1)$ of the first image obtained by the first imaging system IS1. When the feature point S is imaged by the first imaging system IS1, the world coordinate (X, Y, a) of the feature point S is converted into the camera coordinate $(x'_1, y'_1, a')$ of the first imaging system IS1 by the external matrix of the first imaging system IS1. However, as described above, since the origin (reference point) of the world coordinate in the model shown in FIGS. 4 and 5 matches the front principal point of the first optical system OS1 of the first imaging system IS1, there is no rotation or positional shift between the world coordinate of the model shown in FIGS. 4 and 5 and the camera coordinate of the first imaging system IS1. This state can be expressed by the following equation (15). The matrix of 4 rows and 4 columns in the following equation (15) is the external matrix of the first imaging system IS1. Since there is no rotation or positional shift between the world coordinate of the model shown in FIGS. 4 and 5 and the camera coordinate of the first imaging system IS1, the external matrix of the first imaging system IS1 is a unit matrix.

[Equation 15]

$$\begin{pmatrix} x'_1 \\ y'_1 \\ a' \\ 1 \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} X \\ Y \\ a \\ 1 \end{pmatrix} \quad (15)$$

Next, the camera coordinate $(x'_1, y'_1, a')$ of the first imaging system IS1 for the feature point S is converted into the image coordinate $(x_1, y_1)$ of the first image by the internal matrix of the first imaging system IS1. The internal matrix of the first imaging system IS1 can be derived in the same way as the relationship between the size "sz" of the subject 100 and the size "$Y_{FD1}$" of the first subject image represented by the above equation (7) described above with reference to FIG. 2. However, in the model shown in FIGS. 4 and 5, the shift of the position of the optical axis of the first optical system OS1 is taken into consideration and thus the optical axis of the first optical system OS1 is located at not the origin (0, 0) of the first image but the coordinate $(u_1, v_1)$ of the first image. By taking the shift of the position of the optical axis of the first optical system OS1 into consideration, it is possible to obtain the following equation (16). In this regard, although the size "sz" of the subject 100 and the size "$Y_{FD1}$" of the first subject image are expressed in millimeter units in the above equation (7), they are expressed in pixel units because the following equation (16) represents the image coordinate "$x_1$" of the first image.

[Equation 16]

$$x_1 = \frac{K_1}{L_1 + EP_1 \cdot a} \cdot x'_1 + u_1 [\text{pixel}] \text{ where} \quad (16)$$

$$\begin{cases} K_1 = \dfrac{f_1 \cdot (f_1^2 - EP_1 \cdot f_1 + EP_1 \cdot a_{FD1})}{PS_1 \cdot (a_{FD1} - f_1)} \\ L_1 = f_1^2 - EP_1 \cdot f_1 \end{cases}$$

Similarly, it is possible to obtain the following equation (17) for the image coordinate "$y_1$" of the first image.

[Equation 17]

$$y_1 = \frac{K_1}{L_1 + EP_1 \cdot a} \cdot y'_1 + v_1 [\text{pixel}] \quad (17)$$

Here, "$K_1$" and "$L_1$" in the above equations (16) and (17) are determined by the fixed values "$f_1$", "$EP_1$", "$a_{FD1}$" and "$PS_1$" determined by the configuration of the first imaging system IS1. Thus, "$K_1$" and "$L_1$" in the above equations (16) and (17) are also fixed values uniquely determined by the configuration of the first imaging system IS1.

From the above equations (16) and (17), it is possible to obtain the following equation (18) representing the image coordinate $(x_1, y_1)$ of the first image for the feature point S. In this regard, the matrix of 3 rows and 4 columns in the following equation (18) is the internal matrix of the first imaging system IS1.

[Equation 18]

$$\begin{pmatrix} x_1 \\ y_1 \\ 1 \end{pmatrix} \begin{pmatrix} m_1 a & 0 & u_1 & 0 \\ 0 & m_1 a & v_1 & 0 \\ 0 & 0 & 1 & 0 \end{pmatrix} \begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} X \\ Y \\ a \\ 1 \end{pmatrix} = \begin{pmatrix} m_1 X + u_1 \\ m_1 Y + v_1 \\ 1 \end{pmatrix} \text{ where} \quad (18)$$

$$m_1 = \frac{K_1}{L_1 + EP_1 \cdot a}$$

From the above equation (18), it is possible to identify the coordinate $(x_1, y_1)$ of the feature point S of the subject 100 in the first image obtained by the first imaging system IS1. Hereinafter, the feature point S of the subject 100 observed at the image coordinate $(x_1, y_1)$ of the first image is referred to as "a feature point of the first subject image".

The external matrix of 4 rows and 4 columns of the first imaging system IS1 in the above equation (18) reflects the arrangement of the first imaging system IS1 (the arrangement of the first imaging system IS1 with respect to the reference point of the world coordinate) and the internal matrix of 3 rows and 4 columns of the first imaging system IS1 in the above equation (18) reflects the characteristics (the fixed values "$f_1$", "$EP_1$", "$a_{FD1}$", "$PS_1$", "$u_1$" and "$v_1$") of the first imaging system IS1.

Next, discussion is given to the image coordinate $(x_2, y_2)$ of the second image obtained by the second imaging system IS2. The world coordinate $(X, Y, a)$ of the feature point S is converted into the camera coordinate $(x'_2, y'_2, a')$ of the second imaging system IS2 by the external matrix of the second imaging system IS2. At this time, there may be rotation and positional shift of the second imaging system IS2 with respect to the front principal point of the first optical system OS1 of the first imaging system IS1 which matches the origin of the world coordinate.

A rotation matrix "$R^x$" for rotation around the x axis, a rotation matrix "$R^y$" for rotation around the y axis and a rotation matrix "$R^z$" for rotation around the z axis are represented by the following equation (19).

[Equation 19]

$$R^x = \begin{pmatrix} 1 & 0 & 0 \\ 0 & \cos\theta_x & -\sin\theta_x \\ 0 & \sin\theta_x & \cos\theta_x \end{pmatrix} \quad (19)$$

$$R^y = \begin{pmatrix} \cos\theta_y & 0 & -\sin\theta_y \\ 0 & 1 & 0 \\ \sin\theta_y & 0 & \cos\theta_y \end{pmatrix}$$

$$R^z = \begin{pmatrix} \cos\theta_z & -\sin\theta_z & 0 \\ \sin\theta_z & \cos\theta_z & 0 \\ 0 & 0 & 1 \end{pmatrix}$$

Since all of the x axis, the y axis, and the z axis of the second imaging system IS2 have possibility of rotating with respect to the first imaging system IS1, the rotation matrix "$R^x$", the rotation matrix "$R^y$" and the rotation matrix "$R^z$" are multiplied to obtain a rotation matrix "R" of the second imaging system IS2. Thus, the rotation matrix "R" of the second imaging system IS2 is expressed by the following equation (20). Although the rotation matrix "R" is represented by "$R^x$, $R^y$, $R^z$" in the following equation (20), the order of multiplication of the rotation matrix "$R^x$", the rotation matrix "$R^y$" and the rotation matrix "$R^z$" for obtaining the rotation matrix R is not limited thereto. For example, the rotation matrix "R may be represented by "$R^z \cdot R^y \cdot R^x$", "$R^y \cdot R^x \cdot R^z$" or the like. Further, "$R_{11}$", "$R_{12}$", "$R_{13}$", "$R_{21}$", "$R_{22}$", "$R_{23}$", "$R_{31}$", "$R_{32}$", "$R_{33}$" in the following equation (20) are components of the rotation matrix R of the second imaging system IS2 with respect to the first imaging system IS1.

[Equation 20]

$$R = R^x R^y R^z = \quad (20)$$

$$\begin{pmatrix} 1 & 0 & 0 \\ 0 & \cos\theta_x & -\sin\theta_x \\ 0 & \sin\theta_x & \cos\theta_x \end{pmatrix} \begin{pmatrix} \cos\theta_y & 0 & -\sin\theta_y \\ 0 & 1 & 0 \\ \sin\theta_y & 0 & \cos\theta_y \end{pmatrix} \begin{pmatrix} \cos\theta_z & -\sin\theta_z & 0 \\ \sin\theta_z & \cos\theta_z & 0 \\ 0 & 0 & 1 \end{pmatrix} =$$

$$\begin{pmatrix} \cos\theta_y\cos\theta_z & -\cos\theta_y\sin\theta_z & \sin\theta_y \\ \sin\theta_x\sin\theta_y\cos\theta_z + \cos\theta_x\sin\theta_z & -\sin\theta_x\sin\theta_y\sin\theta_z + \cos\theta_x\cos\theta_z & -\sin\theta_x\cos\theta_y \\ -\cos\theta_x\sin\theta_y\cos\theta_z + \sin\theta_x\sin\theta_z & \cos\theta_x\sin\theta_y\sin\theta_z + \sin\theta_x\cos\theta_z & \cos\theta_x\cos\theta_y \end{pmatrix} =$$

$$\begin{pmatrix} R_{11} & R_{12} & R_{13} \\ R_{21} & R_{22} & R_{23} \\ R_{31} & R_{32} & R_{33} \end{pmatrix}$$

Further, as described above, the second imaging system IS2 has the parallel disparities "$P_x$" and "$P_y$" in the parallel direction and the depth disparity "D" in the depth direction with respect to the first imaging system IS1. These disparities can be represented by a parallel matrix "t" represented by the following equation (21).

[Equation 21]

$$t = \begin{pmatrix} -P_x \\ -P_y \\ D \end{pmatrix} \quad (21)$$

The external matrix of the second imaging system IS2 is represented by a combination of the rotation matrix "R" of the above equation (20) and the parallel matrix "t" of the above equation (21). The camera coordinate $(x'_2, y'_2, a')$ of the second imaging system IS2 for the feature point S can be represented by the following equation (22). The matrix of 4 rows and 4 columns in the following equation (22) is the external matrix of the second imaging system IS2.

[Equation 22]

$$\begin{pmatrix} x'_2 \\ y'_2 \\ a' \\ 1 \end{pmatrix} = \begin{pmatrix} R_{11} & R_{12} & R_{13} & -P_x \\ R_{21} & R_{22} & R_{23} & -P_y \\ R_{31} & R_{32} & R_{33} & D \\ 0 & 0 & 0 & 1 \end{pmatrix} \begin{pmatrix} X \\ Y \\ a \\ 1 \end{pmatrix} \quad (22)$$

Next, the camera coordinate $(x'_2, y'_2, a')$ of the second imaging system IS2 for the feature point S is converted into the image coordinate ($x_2$, $y_2$) of the second image by the internal matrix of the second imaging system IS2. In the same manner as the case of the above equations (16) and (17), the image coordinate ($x_2$, $y_2$) of the second image for the feature point S is represented by the following equations (23) and (24).

[Equation 23]

$$x_2 = \frac{K_2}{L_2 + EP_2 \cdot (a+D)} \cdot x_2' + u_2 [\text{pixel}] \quad (23)$$

$$\text{where} \begin{cases} K_2 = \dfrac{f_2 \cdot (f_2^2 - EP_2 \cdot f_2 + EP_2 \cdot a_{FD2})}{PS_2 \cdot (a_{FD2} - f_2)} \\ L_2 = f_2^2 - EP_2 \cdot f_2 \end{cases}$$

[Equation 24]

$$y_2 = \frac{K_2}{L_2 + EP_2 \cdot (a+D)} \cdot y_2' + v_2 [\text{pixel}] \quad (24)$$

Here, "$K_2$" and "$L_2$" in the above equations (23) and (24) are determined by the fixed values "$f_2$", "$EP_2$", "$a_{FD2}$" and "$PS_2$" determined by the configuration of the second imaging system IS2. Thus, "$K_2$" and "$L_2$" in the above equations (23) and (24) are fixed values uniquely determined by the configuration of the second imaging system IS2.

From the above equations (23) and (24), the image coordinate ($x_2$, $y_2$) of the second image for the feature point S can be expressed by the following equation (25). In this regard, the matrix of 3 rows and 4 columns in the following equation (25) is the internal matrix of the second imaging system IS2.

[Equation 25]

$$\begin{pmatrix} x_2 \\ y_2 \\ 1 \end{pmatrix} = \begin{pmatrix} m_2 A & 0 & u_2 & 0 \\ 0 & m_2 A & v_2 & 0 \\ 0 & 0 & 1 & 0 \end{pmatrix} \begin{pmatrix} R_{11} & R_{12} & R_{13} & -P_x \\ R_{21} & R_{22} & R_{23} & -P_y \\ R_{31} & R_{32} & R_{33} & D \\ 0 & 0 & 0 & 1 \end{pmatrix} \begin{pmatrix} X \\ Y \\ a \\ 1 \end{pmatrix} = \quad (25)$$

$$\begin{pmatrix} m_2(R_{11}X + R_{12}Y + R_{13}a - P_x) + u_2 \\ m_2(R_{21}X + R_{22}Y + R_{23}a - P_y) + v_2 \\ 1 \end{pmatrix}$$

$$\text{where} \begin{cases} m_2 = \dfrac{K_2}{L_2 + EP_2(R_{31}X + R_{32}Y + R_{33}a + D)} \\ A = R_{31}X + R_{32}Y + R_{33}a + D \end{cases}$$

From the above equation (25), it is possible to identify the coordinate ($x_2$, $y_2$) of the feature point S of the subject 100 in the second image obtained by the second imaging system IS2. Hereinafter, the feature point S of the subject 100 observed at the image coordinate ($x_2$, $y_2$) of the second image is referred to as "a feature point of the second subject image".

The external matrix of 4 rows and 4 columns of the second imaging system IS2 in the above equation (25) reflects the arrangement of the second imaging system IS2 (the arrangement of the second imaging system IS2 with respect to the reference point of the world coordinate) and the internal matrix of 3 rows and 4 columns of the second imaging system IS2 in the above equation (25) reflects the characteristics (the fixed values "$f_2$", "$EP_2$", "$a_{FD2}$", "$PS_1$", "$u_2$" and "$v_2$") of the second imaging system IS2.

Further, since the "X" in the above equation (18) is equal to the "X" in the above equation (25), the following equation (26) for the distance "a" can be obtained from the above equations (18) and (25). Similarly, since the "Y" in the above equation (18) is equal to the "Y" in the above equation (25), the following equation (27) for the distance "a" can be obtained from the above equation (18) and (25).

[Equation 26]

$$a = -\frac{G_1 x u_2 + G_3}{G_2 x u_2 + G_4} \quad (26)$$

[Equation 27]

$$a = -\frac{G_1 y v_2 + G_5}{G_2 y v_2 + G_6} \quad (27)$$

$$\text{where} \begin{cases} G_1 = EP_2 L_1 (R_{32} y v_1 + R_{31} x u_1) + K_1(EP_2 D + L_2) \\ G_2 = EP_1 EP_2 (R_{32} y v_1 + R_{31} x u_1) + EP_2 K_1 R_{33} \\ G_3 = -K_2 L_1 (R_{12} y v_1 + R_{11} x u_1) + K_1 K_2 P_x \\ G_4 = -K_2 EP_1 (R_{12} y v_1 + R_{11} x u_1) - K_1 K_2 R_{13} \\ G_5 = -K_2 L_1 (R_{22} y v_1 + R_{21} x u_1) + K_1 K_2 P_y \\ G_6 = -K_2 EP_1 (R_{22} y v_1 + R_{21} x u_1) - K_1 K_2 R_{23} \\ \\ xu_1 = x_1 - u_1 \\ yv_1 = y_1 - v_1 \\ xu_2 = x_2 - u_2 \\ yv_2 = y_2 - v_2 \end{cases}$$

Since the above equations (26) and (27) are equivalent to each other, it is possible to obtain the following general equation (28) for the epipolar line by summarizing the coordinates "$x_2$" and "$y_2$" of the feature point of the second subject image in the second image.

[Equation 28]

$$yv_2 = \frac{(G_1 G_6 - G_2 G_5) x u_2 + G_3 G_6 - G_4 G_5}{G_1 G_4 - G_2 G_3} \quad (28)$$

Here, "$G_1$", "$G_2$", "$G_3$", "$G_4$", "$G_5$" and "$G_6$" in the above general equation (28) are determined by the fixed values "$f_1$", "$f_2$", "$EP_1$", "$EP_2$", "$PS_1$", "$PS_2$", "$a_{FD1}$", "$a_{FD2}$", "$P_x$", "$P_y$", "$D$", "$u_1$", "$v_1$", "$u_2$", "$v_2$", "$\theta_x$", "$\theta_y$", "$\theta_z$", "$R_{11}$", "$R_{12}$", "$R_{13}$", "$R_{21}$", "$R_{22}$", "$R_{23}$", "$R_{31}$", "$R_{32}$" and "$R_{33}$" determined by the configurations and the arrangements of the first imaging system IS1 and the second imaging system IS2. Thus, "$G_1$", "$G_2$", "$G_3$", "$G_4$", "$G_5$" and "$G_6$" in the above equation (28) are fixed values uniquely determined by the configurations and the arrangements of the first imaging system IS1 and the second imaging system IS2.

The linear equation related to the coordinates "$x_2$" and "$y_2$" of the feature point of the second subject image in the second image represented by the above equation (28) represents an epipolar line in the second image corresponding to the feature point of the first subject image located at the coordinate ($x_1$, $y_1$) in the first image. Namely, when an arbitrary feature point of the first subject image is detected at the coordinate ($x_1$, $y_1$) in the first image, a feature point of the second subject image corresponding to the arbitrary feature point of the first subject image always exists on the epipolar line represented by the above equation (28) in the second image.

Figure 6:
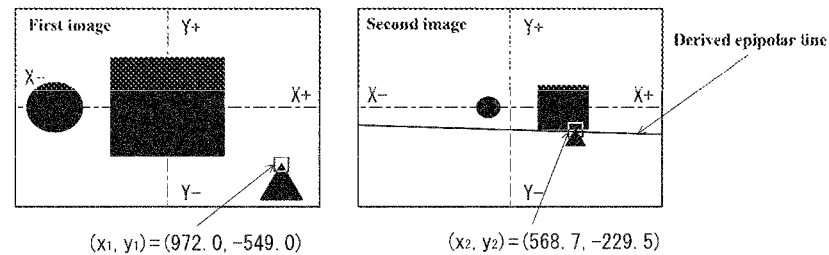
FIG. 6 is a view showing an example of an epipolar line derived with the model shown in FIGS. 4 and 5.

FIG. 6 shows an example of the epipolar line calculated as described above. When the subject 100 is imaged by the first imaging system IS1 and the second imaging system IS2 with the characteristics and the arrangements shown in FIG. 6, the first image and the second image as shown in FIG. 6 are obtained. In the example of FIG. 6, an upper vertex of the triangle included in each of the first image and the second image is defined as an arbitrary feature point S of the subject 100. In each image, a coordinate in which a center point of each image is the origin (the coordinate (0, 0)) is the image coordinate of each image.

When the feature point of the first subject image (the upper vertex of the triangle in the first image) is detected at a position of $(x_1, y_1) = (972.0, -549.0)$ in the first image, the feature point of the second subject corresponding to the feature point of the first subject image always exists on the epipolar line represented by the above equation (28) in the second image. In the illustrated example, the feature point of the second subject corresponding to the feature point of the first subject image exists at the coordinate $(x_2, y_2) = (568.7, -229.5)$ in the second image.

Thus, by deriving the epipolar line in the second image with the above equation (28) and searching pixels on the epipolar line, it is possible to detect the feature point of the second subject image corresponding to the arbitrary feature point of the first subject image without searching the entire area of the second image. In the corresponding feature point detection process for detecting the plurality of feature points of the second subject image in the second image respectively corresponding to the plurality of feature points of the first subject image, it is possible to largely reduce the processing time for the corresponding feature point detection process by performing the search of the feature points with the epipolar line based on the epipolar geometry as described above. For this reason, the distance measuring camera of the present invention realizes drastic reduction of the processing time for calculating the distance "a" to the subject 100 based on the image magnification ratio "MR" between the subject images.

Further, as compared with the pinhole model which is often used for deriving the epipolar line as described above, the model shown in FIGS. 4 and 5 is characterized in that both of the characteristics and the arrangements of the first imaging system IS1 and the second imaging system IS2 are taken into consideration. In particular, the characteristics of the first imaging system IS1 (the fixed values "$f_1$", "$EP_1$", "$a_{FD1}$", "$PS_1$", "$u_1$" and "$v_1$") are reflected in the internal matrix of 3 rows and 4 columns of the first imaging system IS1 in the equation (18) and the characteristics of the second imaging system IS2 (the fixed values "$f_2$", "$EP_2$", "$a_{FD2}$", "$PS_2$", "$u_2$" and "$v_2$") are reflected in the internal matrix of 3 rows and 4 columns of the second imaging system IS2 in the equation (25). Therefore, it is possible to more accurately detect the plurality of feature points of the second subject image in the second image as compared with the case of using the conventional pinhole model.

The distance measuring camera of the present invention utilizes the epipolar line based on the epipolar geometry as described above in the corresponding feature point detection process to detect the plurality of feature points of the second subject image in the second image respectively corresponding to the plurality of feature points of the first subject image detected for measuring the size "$Y_{FD1}$" of the first subject image. A distance between the plurality of detected feature points of the second subject image is measured to obtain the size "$Y_{FD2}$" of the second subject image. The obtained size "$Y_{FD1}$" of the first subject image and the obtained size "$Y_{FD2}$" of the second subject image are used for obtaining the image magnification ratio "MR" between the magnification "$m_1$" of the first subject image and the magnification "$m_2$" of the second subject image and the distance "a" to the subject 100 is calculated based on the image magnification ratio "MR".

As described above, the distance measuring camera of the present invention can actually measure the size "$Y_{FD1}$" of the first subject image and the size "$Y_{FD2}$" of the second subject image from the first image containing the first subject image and the second image containing second subject image obtained by actually imaging the subject 100 with the first imaging system IS1 and the second imaging system IS2 and obtain the image magnification ratio "MR" between the magnification "$m_1$" of the first subject image and the magnification "$m_2$" of the second subject image based on the above equation (14) of "MR"="$Y_{FD2}$"/"$Y_{FD1}$".

In this regard, as is clear from the above equation (11), when the focal length "$f_1$" of the first optical system OS1 is equal to the focal length "$f_2$" of the second optical system OS2 ("$f_1$"="$f$"), the distance "$EP_1$" from the exit pupil of the first optical system OS1 to the image formation position of the first subject image when the subject 100 is located at the infinite distance point is equal to the distance "$EP_2$" from the exit pupil of the second optical system OS2 to the image formation position of the second subject image when the subject 100 is located at the infinite distance point ("EP1"="EP2") and the depth disparity "D" in the depth direction (the optical axis direction) does not exist between the front principal point of the first optical system OS1 and the front principal point of the second optical system OS2 ("D"=0), the image magnification ratio "MR" is not established as the function of the distance "a" and the image magnification ratio "MW" becomes a constant value. In this case, the change of the magnification "$m_1$" of the first subject image according to the distance "a" to the subject 100 becomes the same as the change of the magnification "$m_2$" of the second subject image according to the distance "a" to the subject 100 and thus it becomes impossible to calculate the distance "a" from the first optical system OS1 to the subject 100 based on the image magnification ratio "MR".

Further, as a special condition, even if the conditions of "$f_1$"≠"$f_2$", "$EP_1$"≠"$EP_2$" and "D"=0 are satisfied, in a case of "$f_1$"="$EP_1$" and "$f_2$"="$EP_2$", the image magnification ratio "MR" is not established as the function of the distance "a" and thus the image magnification ratio "MR" becomes a constant value. In such a special case, it is impossible to calculate the distance "a" from the first optical system OS1 to the subject 100 based on the image magnification ratio "MR".

Therefore, in the distance measuring camera of the present invention, the first optical system OS1 and the second optical system OS2 are configured and arranged so that at least one of the following three conditions is satisfied, and thereby the change of the magnification "$m_1$" of the first subject image according to the distance "a" to the subject 100 is different from the change of the magnification "$m_2$" of the second subject image according to the distance "a" to the subject 100.

(First condition) The focal length "$f_1$" of the first optical system OS1 and the focal length "$f_2$" of the second optical system OS2 are different from each other ("$f_1$" "$f_2$").

(Second condition) The distance "$EP_1$" from the exit pupil of the first optical system OS1 to the image formation position of the first subject image when the subject 100 is located at the infinite distance point and the distance "$EP_2$"

from the exit pupil of the second optical system OS2 to the image formation position of the second subject image when the subject 100 is located at the infinite distance point are different from each other ("$EP_1$"≠"$EP_2$").

(Third condition) The difference (depth disparity) "D" in the depth direction (the optical axis direction) exists between the front principal point of the first optical system OS1 and the front principal point of the second optical system OS2 ("D"≠0).

In addition, even if at least one of the first to third conditions described above is satisfied, in the above-described special case ("$f_1$"≠"$f_2$", "$EP_1$"≠"$EP_2$", "D"=0, "$f_1$"="$EP_1$" and "$f_2$"="$EP_2$"), the image magnification ratio "MR" is not established as the function of the distance "a" and thus it is impossible to calculate the distance "a" from the first optical system OS1 to the subject 100 based on the image magnification ratio "MR". Therefore, in order to calculate the distance "a" from the first optical system OS1 to the subject 100 based on the image magnification ratio "MR", the distance measuring camera of the present invention is configured to further satisfy a fourth condition that the image magnification ratio "MR" is established as the function of the distance "a".

Therefore, it is possible to calculate the distance "a" from the front principal point of the first optical system OS1 to the subject 100 by calculating the image magnification ratio "MR" from the size "$Y_{FD1}$" of the first subject image and the size "$Y_{FD2}$" of the second subject image actually measured from the first image and the second image obtained by the distance measuring camera of the present invention.

Hereinafter, the distance measuring camera of the present invention for calculating the distance "a" to the subject 100 based on the image magnification ratio "MR" between the magnification "$m_1$" of the first subject image and the magnification "$m_2$" of the second subject image will be described in detail based on the preferred embodiments shown in the attached drawings.

First Embodiment

Figure 7:
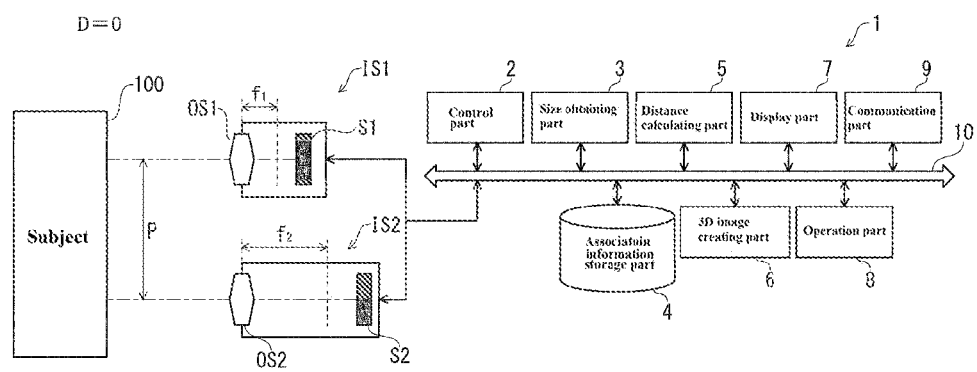
FIG. 7 is a block diagram schematically illustrating a distance measuring camera according to a first embodiment of the present invention.

First, a distance measuring camera 1 according to a first embodiment of the present invention will be described in detail with reference to FIG. 7. FIG. 7 is a block diagram schematically showing the distance measuring camera according to the first embodiment of the present invention.

A distance measuring camera 1 shown in FIG. 7 contains a control part 2 for performing control of the distance measuring camera 1, a first imaging system IS1 including a first optical system OS1 for collecting light from a subject 100 to form a first subject image and a first image sensor S1 for imaging the first subject image to obtain a first image (first image data) containing the first subject image, a second imaging system IS2 including a second optical system OS2 for collecting the light from the subject 100 to form a second subject image and arranged so as to be shifted from the first optical system OS1 by a distance "P" in a direction perpendicular to an optical axis direction of the first optical system OS1 and a second image sensor S2 for imaging the second subject image to obtain a second image (second image data) containing the second subject image, a size obtaining part 3 for obtaining a size "$Y_{FD1}$" of the first subject image and a size "$Y_{FD2}$" of the second subject image, an association information storage part 4 storing association information for associating an image magnification ratio "MR" between a magnification "$m_1$" of the first subject image and a magnification "$m_2$" of the second subject image with a distance "a" to the subject 100, a distance calculating part 5 for calculating the distance "a" to the subject 100 based on the image magnification ratio "MR" between the magnification "$m_1$" of the first subject image and the magnification "$m_2$" of the second subject image which is obtained as a ratio between the size "$Y_{FD1}$" of the first subject image and the size "$Y_{FD2}$" of the second subject image obtained by the size obtaining part 3, a three-dimensional (3D) image creating part 6 for creating a three-dimensional image of the subject 100 based on the first image obtained by the first image sensor S1 or the second image obtained by the second image sensor S2 and the distance "a" to the subject 100 calculated by the distance calculating part 5, a display part 7 such as a liquid crystal panel for displaying arbitrary information, an operation part 8 for inputting an operation from a user, a communication part 9 for performing communication with external devices and a data bus 10 for transmitting and receiving data among components of the distance measuring camera 1.

The distance measuring camera 1 of the present embodiment is characterized in that the first optical system OS1 and the second optical system OS2 are configured so as to satisfy the first condition that the focal length "$f_1$" of the first optical system OS1 and the focal length "$f_2$" of the second optical system OS2 are different from each other ("$f_1$"≠"$f_2$") among the above-described three conditions required for calculating for the distance "a" to the subject 100 based on the image magnification ratio "MR". On the other hand, in the present embodiment, the first optical system OS1 and the second optical system OS2 are configured and arranged so as not to satisfy the other two conditions ("$EP_1$"≠"$EP_2$" and "D"≠0) among the above-described three conditions. Further, the distance measuring camera 1 of the present embodiment is configured so as to satisfy the fourth condition that the image magnification ratio "MR" is established as the function of the distance "a".

Therefore, the above-described general equation (13) for calculating the distance "a" to the subject 100 using the image magnification ratio "MR" is simplified by the conditions of "$EP_1$"="$EP_2$"="EP" and "D"=0 and thus can be expressed by the following equation (29).

[Equation 29]

$$a = -\frac{G_1 x u_2 + G_3}{G_2 x u_2 + G_4} \quad (29)$$

where
$$\begin{cases} G_1 = EPL_4(R_{32}yv_1 + R_{31}xu_1) + K_1L_2 \\ G_2 = EP^2(R_{32}yv_1 + R_{31}xu_1) + EPK_1R_{33} \\ G_3 = -K_2L_1(R_{12}yv_1 + R_{11}xu_1) + K_1K_2P_x \\ G_4 = -K_2EP(R_{12}yv_1 + R_{11}xu_1) - K_1K_2R_{13} \\ K_1 = \dfrac{f_1 \cdot (f_1^2 - EP \cdot f_1 + EP \cdot a_{FD})}{PS_1 \cdot (a_{FD} - f_1)} \\ K_2 = \dfrac{f_2 \cdot (f_2^2 - EP \cdot f_2 + EP \cdot a_{FD2})}{PS_2 \cdot (a_{FD2} - f_2)} \\ L_1 = f_1^2 - EP \cdot f_1 \\ L_2 = f_2^2 - EP \cdot f_2 \end{cases}$$

The distance measuring camera 1 of the present embodiment calculates the image magnification ratio "MR" between the magnification "$m_1$" of the first subject image and the magnification "$m_2$" of the second subject image by imaging the subject 100 with the first imaging system IS1 and the second imaging system IS2 to calculate the distance "a" to the subject 100 according to the above equation (29).

Further, in the distance measuring camera 1 of the present embodiment, the size obtaining part 3 detects a plurality of feature points (for example, both edge portions in a height direction or a width direction) of the first subject image in the first image obtained by the first image sensor S1 and measures a distance between the plurality of feature points to obtain the size "$Y_{FD1}$" of the first subject image. Furthermore, the size obtaining part 3 detects a plurality of feature points of the second subject image in the second image respectively corresponding to the plurality of detected feature points of the first subject image and measure a distance between the plurality of feature points of the second subject image to obtain the size "$Y_{FD2}$" of the second subject image.

Further, the distance measuring camera 1 of the present embodiment uses the epipolar line based on the epipolar geometry in the corresponding feature point detection process for detecting the plurality of feature points of the second subject image in the second image respectively corresponding to the plurality of feature points of the first subject image. The above general formula (28) representing the epipolar line is simplified by the condition of "$EP_1$"="$EP_2$"="EP" and "D"=0 and thus can be expressed by the following equation (30).

[Equation 30]

$$yv_2 = \frac{(G_1G_6 - G_2G_5)xu_2 + G_3G_6 - G_4G_5}{G_1G_4 - G_2G_3} \quad (30)$$

where
$$\begin{cases} G_5 = -K_2L_1(R_{22}yv_1 + R_{21}xu_1) + K_1K_2P_y \\ G_6 = -K_2EP(R_{22}yv_1 + R_{21}xu_1) - K_1K_2R_{23} \end{cases}$$

The distance measuring camera 1 of the present embodiment can detect the plurality of feature points of the second subject image in the second image respectively corresponding to the plurality of feature points of the first subject image by searching pixels on the epipolar line represented by the above equation (30) in the second image. Thus, it is possible to detect the plurality of feature points of the second subject image without searching the entire area of the second image and thus it is possible to largely reduce the processing time for the corresponding feature point detection process. As a result, it is possible to largely reduce the processing time for calculating the distance "a" to the subject 100 based on the image magnification ratio "MR" between the subject images.

Hereinafter, each component of the distance measuring camera 1 will be described in detail. The control part 2 transmits and receives various data and various instructions to and from the respective components through the data bus 10 to perform the control of the distance measuring camera 1. The control part 2 includes a processor for executing arithmetic processing and a memory storing data, programs, modules and the like required for performing the control of the distance measuring camera 1. The processor of the control part 2 can perform the control of the distance measuring camera 1 by using the data, programs, modules and the like stored in the memory. Further, the processor of the control part 2 can provide a desired function by using each component of the distance measuring camera 1. For example, the processor of the control part 2 can use the distance calculating part 5 to perform processing for calculating the distance "a" to the subject 100 based on the image magnification ratio "MR" between the magnification "$m_1$" of the first subject image and the magnification "$m_2$" of the second subject image.

For example, the processor of the control part 2 is one or more operation units such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes such as signal manipulation based on computer-readable instructions. Among other capabilities, the processor of the control part 2 is configured to fetch computer-readable instructions (such as data, programs and modules) stored in the memory of the control part 2 to perform arithmetic operation, signal control and signal manipulation.

The memory of the control part 2 is a removable or non-removable computer-readable medium containing volatile memories (such as RAMs, SRAMs and DRAMs), non-volatile memories (such as ROM, EPROMs, EEPROM, flash memories, hard disks, optical discs, CD-ROMs, digital versatile discs (DVDs), magnetic cassettes, magnetic tapes and magnetic disks) and combinations thereof.

In the memory of the control part 2, the fixed values "$f_1$", "$f_2$", "$EP_1$", "$EP_2$", "$a_{FD1}$", "$a_{FD2}$", "$PS_1$", "$PS_2$", "$P_x$", "$P_y$", "D", "$u_1$", "$v_1$", "$u_2$", "$v_2$", "$\theta_x$", "$\theta_y$", "$\theta_z$", "$R_{11}$", "$R_{12}$", "$R_{13}$", "$R_{21}$", "$R_{22}$", "$R_{23}$", "$R_{31}$", "$R_{32}$" and "$R_{33}$" determined by the configurations and the arrangements of the first imaging system IS1 and the second imaging system IS2 and the fixed values "$L_1$", "$L_2$", "K", "$K_1$", "$K_2$", "$G_1$", "$G_2$", "$G_3$", "$G_4$", "$G_5$", "$G_6$" derived from the above fixed values and used in the general equation (13) (or the simplified equation (29)) for calculating the distance "a" to the subject 100 and the general equation (28) (or the simplified equation (30)) for the epipolar line in the second image are stored in advance.

The first imaging system IS1 includes the first optical system OS1 and the first image sensor S1. The first optical system OS1 has a function of collecting the light from the subject 100 to form the first subject image on an imaging surface of the first image sensor S1. The first image sensor S1 has a function of imaging the first subject image formed on the imaging surface thereof to obtain the first image (first image data) containing the first subject image. The second imaging system IS2 includes the second optical system OS2 and the second image sensor S2. The second optical system OS2 has a function of collecting the light from the subject 100 to form the second subject image on an imaging surface of the second image sensor S2. The second image sensor S2 has a function of imaging the second subject image formed on the imaging surface thereof to obtain the second image (second image data) containing the second subject image.

Although the first image sensor S1 and the first optical system OS1 constituting the first imaging system IS1 are provided in one housing and the second image sensor S2 and the second optical system OS2 and the second image sensor S2 constituting the second imaging system IS2 are provided in another housing in the illustrated aspect, the present invention is not limited thereto. The scope of the present invention involves an aspect in which all of the first optical system OS1, the second optical system OS2, the first image sensor S1 and the second image sensor S2 are provided in one housing.

Each of the first optical system OS1 and the second optical system OS2 is constituted of one or more lenses and an optical element such as an aperture. As described above, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"). With this configuration, the first optical system OS1 and the second optical system OS2 are configured so that a change of the magnification "$m_1$" of the first subject image formed by the first optical system OS1 according to the distance "a" to the subject 100 is different from a change of the magnification "$m_2$" of the second subject image formed by the second optical system OS2 according to the distance "a" to the subject 100. The image magnification "MR" is a ratio between the magnification "$m_1$" of the first subject image and the magnification "$m_2$" of the second subject image obtained by the first optical system OS1 and the second optical system OS2 configured as described above and used for calculating the distance "a" to the subject 100.

Further, although an optical axis of the first optical system OS1 and an optical axis of the second optical system OS2 are parallel to each other, the optical axis of the first optical system OS1 and the optical axis of the second optical system OS2 do not coincide with each other as illustrated. Further, the second optical system OS2 is arranged so as to be shifted from the first optical system OS1 by the distance "P" in the direction perpendicular to the optical axis direction of the first optical system OS1.

Each of the first image sensor S1 and the second image sensor S2 may be a color image sensor such as a CMOS image sensor or a CCD image sensor having a color filter such as an RGB primary color filter and a CMY complementary color filter arranged in any pattern such as a bayer arrangement or a monochrome image sensor having no color filter. In this case, the first image obtained by the first image sensor S1 and the second image obtained by the second image sensor S2 are color or monochrome luminance information of the subject 100.

Further, each of the first image sensor S1 and the second image sensor S2 may be a phase sensor for obtaining phase information of the subject 100. In this case, the first image obtained by the first image sensor S1 and the second image obtained by the second image sensor S2 are phase information of the subject 100.

The first subject image is formed on the imaging surface of the first image sensor S1 by the first optical system OS1 and then the first image sensor S1 obtains the first image containing the first subject image. The obtained first image is transmitted to the control part 2 and the size obtaining part 3 through the data bus 10. Similarly, the second subject image is formed on the imaging surface of the second image sensor S2 by the second optical system OS2 and then the second image sensor S2 obtains the second image containing the second subject image. The obtained second image is transmitted to the control part 2 and the size obtaining part 3 through the data bus 10.

The first image and the second image transmitted to the size obtaining part 3 are used for obtaining the size "$Y_{FD1}$" of the first subject and the size "$Y_{FD2}$" of the second subject. On the other hand, the first image and the second image transmitted to the control part 2 is used for image displaying with the display part 7 and the communication of image signals with the communication part 9.

The size obtaining part 3 has a function of obtaining the size "$Y_{FD1}$" of the first subject and the size "$Y_{FD2}$" of the second subject from the first image containing the first subject image and the second image containing the second subject image. Specifically, the size obtaining part 3 detects the plurality of feature points of the first subject image in the first image and measures the distance between the plurality of detected feature points of the first subject image to obtain the size "$Y_{FD1}$" of the first subject image. Further, the size obtaining part 3 detects the plurality of feature points of the second subject image in the second image respectively corresponding to the plurality of detected feature points of the first subject image and measures the distance between the plurality of detected feature points of the second subject to obtain the size "$Y_{FD2}$" of the second subject image.

Specifically, the size obtaining part 3 receives the first image from the first image sensor S1 and receives the second image from the second image sensor S2. After that, the size obtaining part 3 detects the plurality of arbitrary feature points of the first subject image in the first image. A method of the size obtaining part 3 for detecting the plurality of arbitrary feature points of the first subject image in the first image is not particularly limited. The size obtaining part 3 can use various methods known in the art to detect the plurality of arbitrary feature points of the first subject image in the first image. The coordinate ($x_1$, $y_1$) of each of the feature points detected by the size obtaining part 3 is temporarily stored in the memory of the control part 2.

In one example, the size obtaining part 3 subjects a filtering process such as a Canny method on the first image to extract edge portions of the first subject image in the first image. After that, the size obtaining part 3 detects some of the extracted edge portions of the first subject image as the plurality of feature points of the first subject image and measures the distance between the plurality of feature points to obtain the size "$Y_{FD1}$" of the first subject image. In this case, the size obtaining part 3 may detect edge portions corresponding to both ends in the height direction of the first subject image as the plurality of feature points of the first subject image and obtain the distance between the plurality of feature points as the size (image height) "$Y_{FD1}$" of the first subject image or may detect edge portions corresponding to both ends in the width direction of the first subject image as the plurality of feature points of the first subject image and obtain the distance between the plurality of feature points as the size (image width) "$Y_{FD1}$" of the first subject image.

After the size "$Y_{FD1}$" of the first subject image is obtained, the size obtaining part 3 performs the corresponding feature point detection process for detecting the plurality of feature points of the second subject image in the second image respectively corresponding to the plurality of detected feature points of the first subject image.

Specifically, the size obtaining part 3 first refers to the coordinates ($x_1$, $y_1$) of the plurality of feature points of the first subject image stored in the memory of the control part 2 and selects any one of the detected feature points of the first subject image. Next, the size obtaining part 3 cuts out an area having a predetermined size and whose center is positioned at the selected feature point (for example, 5×5 pixel area, 7×7 pixel area or the like whose center is positioned at the selected feature point) from the first image to obtain a search block for the selected feature point. This search block is used for searching a feature point of the second subject image in the second image corresponding to the selected feature point of the first subject. The obtained search block is temporarily stored in the memory of the control part 2.

After that, the size obtaining part 3 derives an epipolar line corresponding to the selected feature point of the first subject image according to the above equation (30) (or the general equation (28)) with the fixed values stored in the memory of the control part 2. Next, the size obtaining part 3 searches pixels on the derived epipolar line to detect the feature point of the second subject image in the second image corresponding to the selected feature point of the first subject image.

Specifically, the size obtaining part 3 performs convolution calculation (convolution integration) between the search block for the selected feature point of the first subject image stored in the memory of the control part 2 and each of epipolar line peripheral areas having the same size as that of the search block and whose centers are respectively positioned at the pixels on the epipolar line in the second image to calculate correlation values between the search block and each of the epipolar line peripheral areas. This calculation of the correlation values is performed along the derived epipolar line in the second image. The size obtaining part 3 detects a center pixel of the epipolar line peripheral area (i.e., the pixel on the epipolar line) having a highest correlation value as the feature point of the second subject image in the second image corresponding to the selected feature point of the first subject image. The calculated coordinate $(x_2, y_2)$ of the feature point of the second subject image is temporarily stored in the memory of the control part 2.

When the convolution calculation between the search block and each of the epipolar line peripheral areas is performed, an interpolation of pixels with respect to the search block or the second image may be performed. Any technique known in the art may be used in the corresponding feature point detection process to accurately obtain the correlation values between the search block and each of the epipolar line peripheral areas.

This process is repeatedly performed with changing the selected feature point of the first subject image until all of the feature points of the second subject image in the second image respectively corresponding to the detected feature points of the first subject image are detected. Thus, the size obtaining part 3 derives a plurality of epipolar lines respectively corresponding to the plurality of detected feature points of the first subject image according to the above equation (30) (or the general equation (28)) and searches pixels on each of the epipolar lines as described above to detect the plurality of feature points of the second subject image in the second image respectively corresponding to the plurality of feature points of the detected first subject image. When all of the feature points of the second subject image in the second image respectively corresponding to the detected feature points of the first subject image are detected, the corresponding feature point detection process by the size obtaining part 3 ends.

After the corresponding feature point detection process is completed, the size obtaining part 3 measures the distance between the plurality of feature points of the second subject image from the coordinates $(x_2, y_2)$ of the plurality of feature points of the second subject image temporarily stored in the memory of the control part 2 to obtain the size "$Y_{FD2}$" of the second subject image.

As described above, the epipolar line represented by the above equation (30) (or the general equation (28)) is derived with the model in which the characteristics and the arrangements of the first imaging system IS1 and the second imaging system IS2 as shown in FIGS. 4 and 5 are taken into consideration instead of the pinhole model which is generally used in the prior art and in which the characteristics of the first imaging system IS1 and the second imaging system IS2 are not taken into consideration.

Therefore, the size obtaining part 3 can more accurately detect the plurality of feature points of the second subject image in the second image as compared with the case of deriving the plurality of epipolar lines in the second image with the conventional pinhole model to detect the plurality of feature points of the second subject image in the second image. Thus, it is possible to more accurately measure the distance "a" to the subject 100.

The association information storage part 4 is an arbitrary non-volatility storage medium (such as a hard disk and a flash memory) for storing the association information for associating the image magnification ratio "MR" ("$m_2$"/"$m_1$") between the magnification "$m_1$" of the first subject image and the magnification "$m_2$" of the second subject image with the distance "a" from the front principal point of the first optical system OS1 to the subject 100. The association information stored in the association information storage part 4 is information for calculating the distance "a" to the subject 100 from the image magnification ratio "MR" ("$m_2$"/"$m_1$") between the magnification "$m_1$" of the first subject image and the magnification "$m_2$" of the second subject image.

Typically, the association information stored in the association information storage part 4 contains the above equation (29) (or the general equation (13)) for calculating the distance "a" to the subject 100 based on the image magnification ratio "MR". Alternatively, the association information stored in the association information storage part 4 may be a look-up table for uniquely associating the image magnification ratio "MW" with the distance "a" to the subject 100. By referring to such association information stored in the association information storage part 4, it becomes possible to calculate the distance "a" to the subject 100 based on the image magnification ratio "MR". In the case where the association information stored in the association information storage part 4 is the above-described equation for calculating the distance "a" to the subject 100, the fixed values stored in the memory of the control part 2 are also referred to calculate the distance "a" to the subject 100.

The distance calculating part 5 has a function of calculating the distance "a" to the subject 100 based on the image magnification ratio "MW" between the magnification "$m_1$" of the first subject image and the magnification "$m_2$" of the second subject which is obtained as the ratio between the size "$Y_{FD1}$" of the first subject image and the size "$Y_{FD2}$" of the second subject image obtained by the size obtaining part 3. Specifically, the distance calculating part 5 calculates the image magnification ratio "MR" between the magnification "$m_1$" of the first subject image and the magnification "$m_2$" of the second subject based on the size "$Y_{FD1}$" of the first subject image and the size "$Y_{FD2}$" of the second subject image obtained by the size obtaining part 3 according to the equation (14) "MR"="$Y_{FD2}$"/"$Y_{FD1}$". After that, the distance calculating part 5 refers to the association information stored in the association information storage part 4 (and the fixed values stored in the memory of the control part 2 if the association information is the above-described equation for calculating the distance "a" to the subject 100) to calculate (identify) the distance "a" to the subject 100 based on the image magnification ratio "MR".

The three-dimensional image creating part 6 has a function of creating a three-dimensional image of the subject 100 based on the distance "a" to the subject 100 calculated by the distance calculating part 5 and the color or monochrome luminance information of the subject 100 (that is the first image or the second image) obtained by the first image sensor S1 or the second image sensor S2. The words of "the three-dimensional image of the subject 100" used in the specification means data in which the calculated distance "a" to the subject 100 is associated with pixels of the color or monochrome two-dimensional image (the normal image) of the subject 100. In this regard, if each of the first image sensor S1 and the second image sensor S2 is the phase sensor for obtaining the phase information of the subject 100, the three-dimensional image creating part 6 may be omitted.

The display part 7 is panel type display means such as a liquid crystal display. The display part 7 displays various information containing the color or monochrome luminance information or the phase information of the subject 100 (the first image or the second image) obtained by the first image sensor S1 or the second image sensor S2, the distance "a" to the subject 100 calculated by the distance calculating part 5, the three-dimensional image of the subject 100 created by the three-dimensional image creating part 6 and information required for operating the distance measuring camera 1 in the form of characters or images in accordance with the control from the processor of the control part 2.

The operation part 8 is used for performing operations by the user of the distance measuring camera 1. The operation part 8 is not particularly limited to a specific kind as long as the user of the distance measuring camera 1 can use the operation part 8 to perform the operations. For example, it is possible to employ a mouse, a keyboard, a numeric keypad, a button, a dial, a lever, a touch panel or the like as the operation part 8. The operation part 8 transmits signals respectively corresponding to the operations from the user of the distance measuring camera 1 to the processor of the control part 2.

The communication part 9 has a function of inputting data into the distance measuring camera 1 and/or outputting data from the distance measuring camera 1 to external devices. The communication part 9 may be configured to be connected to a network such as the Internet. In this case, the distance measuring camera 1 can use the communication part 9 to perform communication with the external devices such as a web server and a data server provided outside the distance measuring camera 1.

As described above, in the distance measuring camera 1 of this embodiment, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"), and thereby the change of the magnification "$m_1$" of the first subject image with respect to the distance "a" to the subject 100 and the change of the magnification "$m_2$" of the second subject image according to the distance "a" to the subject 100 are different from each other. Thus, the distance measuring camera 1 of this embodiment can uniquely calculate the distance "a" to the subject 100 based on the image magnification ratio "MW" ("$m_2$"/"$m_1$") between the magnification "$m_1$" of the first subject image and the magnification "$m_2$" of the second subject image.

Further, the distance measuring camera 1 of the present embodiment uses the epipolar line based on the epipolar geometry in the corresponding feature point detection process performed by the size obtaining part 3. Therefore, it is possible to largely reduce the processing time for the corresponding feature point detection process and thus it is possible to largely reduce the processing time for calculating the distance "a" to the subject 100.

Further, the epipolar line represented by the above equation (30) (or the general equation (28)) is derived with the model in which both of the characteristics and the arrangements of the first imaging system IS1 and the second imaging system IS2 as shown in FIGS. 4 and 5 are taken into consideration instead of the pinhole model which is generally used in the prior art in which the characteristics of the first imaging system IS1 and the second imaging system IS2 are not taken into consideration. Therefore, it is possible to more accurately detect the plurality of feature points of the second subject image in the second image as compared with the case of detecting the plurality of epipolar lines in the second image with the conventional pinhole model to detect the plurality of feature points of the second subject image in the second image. As a result, it is possible to improve the accuracy of the measurement of the distance "a" to the subject 100 by the distance measuring camera 1.

Second Embodiment

Figure 8:
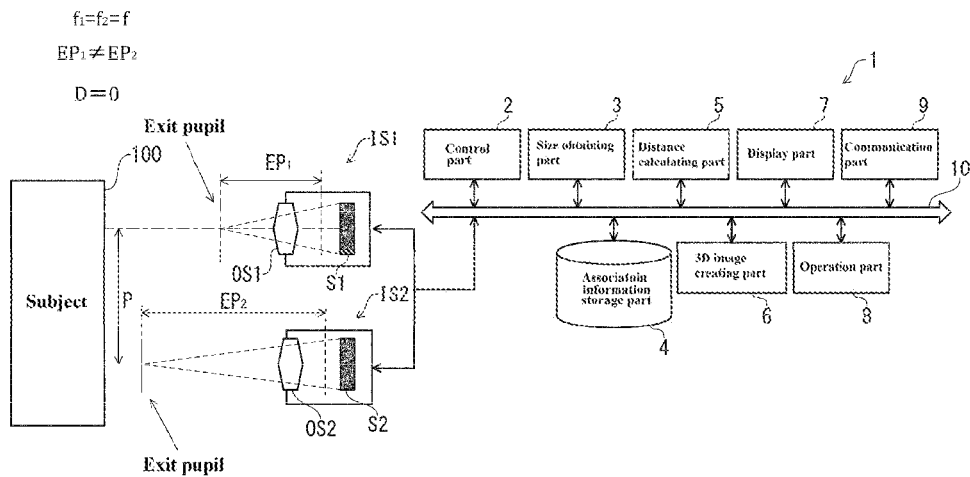
FIG. 8 is a block diagram schematically illustrating a distance measuring camera according to a second embodiment of the present invention.

Next, a distance measuring camera 1 according to a second embodiment of the present invention will be described in detail with reference to FIG. 8. FIG. 8 is a block diagram schematically showing the distance measuring camera according to the second embodiment of the present invention.

Hereinafter, the distance measuring camera 1 of the second embodiment will be described by placing emphasis on the points differing from the distance measuring camera 1 of the first embodiment with the same matters being omitted from the description. The distance measuring camera 1 of the present embodiment has the same configuration as the configuration of the distance measuring camera 1 of the first embodiment except that the configurations of the first optical system OS1 and the second optical system OS2 are modified.

The distance measuring camera 1 of the present embodiment is characterized in that the first optical system OS1 and the second optical system OS2 are configured so as to satisfy the second condition that the distance "$EP_1$" from the exit pupil of the first optical system OS1 to the image formation position of the first subject image when the subject 100 is located at the infinite distance point and the distance "$EP_2$" from the exit pupil of the second optical system OS2 to the image formation position of the second subject image when the subject 100 is located at the infinite distance point are different from each other ("$EP_1$"≠"$EP_2$") among the above-described three conditions required for calculating the distance "a" to the subject 100 based on the image magnification ratio "MR". On the other hand, in the present embodiment, the first optical system OS1 and the second optical system OS2 are configured and arranged so as not to satisfy the other two conditions ("$f_1$"≠"$f_2$" and "D"≠0) among the above-described three conditions. Further, the distance measuring camera 1 of the present embodiment is configured so as to satisfy the fourth condition that the image magnification ratio "MR" is established as the function of the distance "a".

The general equation (13) for calculating the distance "a" to the subject 100 based on the magnification ratio "MR" is simplified by the conditions of "$f_1$"="$f_2$"="f" and "D"=0 and can be expressed by the following equation (31).

[Equation 31]

$$a = -\frac{G_1 x u_2 + G_3}{G_2 x u_2 + G_4} \quad (31)$$

where
$$\begin{cases} G_1 = EP_2 L_1 (R_{32} y v_1 + R_{31} x u_1) + K_1 L_2 \\ G_2 = EP_1 EP_2 (R_{32} y v_1 + R_{31} x u_1) + EP_2 K_1 R_{33} \\ G_3 = -K_2 L_1 (R_{12} y v_1 + R_{11} x u_1) + K_1 K_2 P_x \\ G_4 = -K_2 EP_1 (R_{12} y v_1 + R_{11} x u_1) - K_1 K_2 R_{13} \\ K_1 = \dfrac{f \cdot (f^2 - EP_1 \cdot f + EP_1 \cdot a_{FD})}{PS_1 \cdot (a_{FD} - f)} \\ K_2 = \dfrac{f \cdot (f^2 - EP_2 \cdot f + EP_2 \cdot a_{FD2})}{PS_2 \cdot (a_{FD2} - f)} \\ L_1 = f^2 - EP_1 \cdot f \\ L_2 = f^2 - EP_2 \cdot f \end{cases}$$

Further, the general equation (28) representing the epipolar line is simplified by the conditions of "$f_1$"="$f_2$"="$f$" and "D"=0 and can be expressed by the following equation (32).

[Equation 32]

$$yv_2 = \frac{(G_1 G_6 - G_2 G_5) x u_2 + G_3 G_6 - G_4 G_5}{G_1 G_4 - G_2 G_3} \quad (32)$$

where $\begin{cases} G_5 = -K_2 L_1 (R_{22} y v_1 + R_{21} x u_1) + K_1 K_2 P_y \\ G_6 = -K_2 EP_1 (R_{22} y v_1 + R_{21} x u_1) - K_1 K_2 R_{23} \end{cases}$ As described above, in the distance measuring camera 1 of the present embodiment, the first optical system OS1 and the second optical system OS2 are configured so that the distance "$EP_1$" from the exit pupil of the first optical system OS1 to the image formation position of the first subject image when the subject 100 is located at the infinite distance point and the distance "$EP_2$" from the exit pupil of the second optical system OS2 to the image formation position of the second subject image when the subject 100 is located at the infinite distance point are different from each other ("$EP_1$"≠"$EP_2$"), and thereby the change of the magnification "$m_1$" of the first subject image according to the distance "a" to the subject 100 and the change of the magnification "$m_2$" of the second subject image according to the distance "a" to the subject 100 are different from each other. Therefore, the distance measuring camera 1 of the present embodiment can uniquely calculate the distance "a" to the subject 100 based on the image magnification ratio "MR" ("$m_2$"/"$m_1$") between the magnification "$m_1$" of the first subject image and the magnification "$m_2$" of the second subject image.

Furthermore, the distance measuring camera 1 of the present embodiment can search the pixels on the epipolar lines in the second image represented by the above-described equation (32) to detect the plurality of feature points of the second subject image in the second image respectively corresponding to the plurality of feature points of the first subject image. Thus, it is possible to detect the plurality of feature points of the second subject image without searching the entire area of the second image and thus it is possible to largely reduce the processing time for the corresponding feature point detection process. As a result, it is possible to largely reduce the processing time for calculating the distance "a" to the subject 100 based on the image magnification ratio "MR" between the subject images. Therefore, according to the present embodiment, it is also possible to provide the same effects as those of the above-described first embodiment.

Third Embodiment

Figure 9:
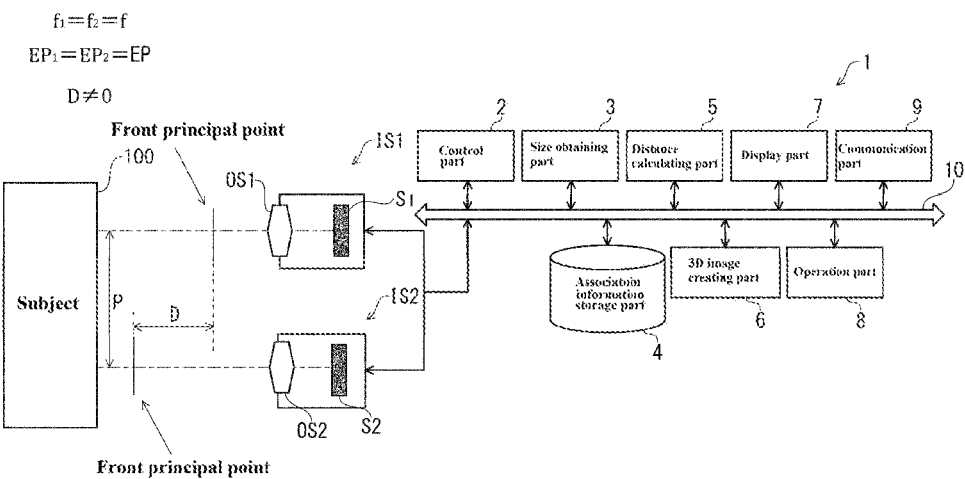
FIG. 9 is a block diagram schematically illustrating a distance measuring camera according to a third embodiment of the present invention.

Next, a distance measuring camera 1 according to a third embodiment of the present invention will be described in detail with reference to FIG. 9. FIG. 9 is a block diagram schematically showing the distance measuring camera according to the third embodiment of the present invention.

Hereinafter, the distance measuring camera 1 of the third embodiment will be described by placing emphasis on the points differing from the distance measuring camera 1 of the first embodiment with the same matters being omitted from the description. The distance measuring camera 1 of the present embodiment has the same configuration as the configuration of the distance measuring camera 1 of the first embodiment except that the configurations and arrangements of the first optical system OS1 and the second optical system OS2 are modified.

The distance measuring camera 1 of the present embodiment is characterized in that the first optical system OS1 and the second optical system OS2 are configured and arranged so as to satisfy the third condition that the difference (depth disparity) "D" in the depth direction (the optical axis direction) exists between the front principal point of the first optical system OS1 and the front principal point of the second optical system OS2 among the above-described three conditions required for calculating the distance "a" to the subject 100 based on the image magnification ratio "MR". On the other hand, in the present embodiment, the first optical system OS1 and the second optical system OS2 are configured so as not to satisfy the other two conditions ("$f_1$"≠"$f_2$" and "$EP_1$"≠"$EP_2$") among the above-described three conditions. Further, the distance measuring camera 1 of the present embodiment is configured to satisfy the fourth condition that the image magnification ratio "MR" is established as the function of the distance "a".

The general equation (13) for calculating the distance "a" to the subject 100 based on the magnification ratio "MR" is simplified by the conditions of "$f_1$"="$f_2$"="$f$" and "$EP_1$"="$EP_2$"="$EP$" and can be expressed by the following equation (33).

[Equation 33]

$$a = -\frac{G_1 x u_2 + G_3}{G_2 x u_2 + G_4} \quad (33)$$

where
$$\begin{cases} G_1 = EPL_1 (R_{32} y v_1 + R_{31} x u_1) + K_1 (EPD + L_2) \\ G_2 = EP^2 (R_{32} y v_1 + R_{31} x u_1) + EPK_1 R_{33} \\ G_3 = -K_2 L_1 (R_{12} y v_1 + R_{11} x u_1) + K_1 K_2 P_x \\ G_4 = -K_2 EP(R_{12} y v_1 + R_{11} x u_1) - K_1 K_2 R_{13} \\ K_1 = \dfrac{f \cdot (f^2 - EP \cdot f + EP \cdot a_{FD})}{PS_1 \cdot (a_{FD} - f)} \\ K_2 = \dfrac{f \cdot (f^2 - EP \cdot f + EP \cdot a_{FD2})}{PS_2 \cdot (a_{FD2} - f)} \\ L_1 = f^2 - EP \cdot f \\ L_2 = f^2 - EP \cdot f \end{cases}$$

Further, the general equation (28) representing the epipolar line is simplified by the conditions of "$f_1$"="$f_2$"="$f$" and "$EP_1$"="$EP_2$"="$EP$" and can be expressed by the following equation (34).

[Equation 34]

$$yv_2 = \frac{(G_1G_6 - G_2G_5)xu_2 + G_3G_6 - G_4G_5}{G_1G_4 - G_2G_3} \quad (34)$$

where
$$\begin{cases} G_5 = -K_2L_1(R_{22}yv_1 + R_{21}xu_1) + K_1K_2P_y \\ G_6 = -K_2EP(R_{22}yv_1 + R_{21}xu_1) - K_1K_2R_{23} \end{cases}$$

As described above, in the distance measuring camera 1 of the present embodiment, the first optical system OS1 and the second optical system OS2 are configured and arranged so that the difference (depth disparity) "D" in the depth direction (the optical axis direction) exists between the front principal point of the first optical system OS1 and the front principal point of the second optical system OS2 ("D"≠0), and thereby the change of the magnification "$m_1$" of the first subject image according to the distance "a" to the subject 100 and the change of the magnification "$m_2$" of the second subject image according to the distance "a" to the subject 100 are different from each other. Therefore, the distance measuring camera 1 of the present embodiment can uniquely calculate the distance "a" to the subject 100 based on the image magnification ratio "MR" ("$m_2$"/"$m_1$") between the magnification "$m_1$" of the first subject image and the magnification "$m_2$" of the second subject image.

Furthermore, the distance measuring camera 1 of the present embodiment can search the pixels on the epipolar lines in the second image represented by the above-described equation (34) to detect the plurality of feature points of the second subject image in the second image respectively corresponding to the plurality of feature points of the first subject image. Thus, it is possible to detect the plurality of feature points of the second subject image without searching the entire area of the second image and thus it is possible to largely reduce the processing time for the corresponding feature point detection process. As a result, it is possible to largely reduce the processing time for calculating the distance "a" to the subject 100 based on the image magnification ratio "MR" between the subject images. Therefore, according to the present embodiment, it is also possible to provide the same effects as those of the above-described first embodiment.

As described above in detail with reference to the embodiments, the distance measuring camera 1 of the present embodiment can calculate the image magnification ratio "MR" based on the size "$Y_{FD1}$" of the first subject image and the size "$Y_{FD2}$" of the second subject image actually measured from the first image obtained by the first imaging system IS1 and the second image obtained by the second imaging system IS2 to calculate the distance "a" from the front principal point of the first optical system OS1 to the subject 100.

Further, the epipolar line based on the epipolar geometry is used in the corresponding feature point detection process for measuring the size "$Y_{FD2}$" of the second subject image. Thus, it is possible to detect the plurality of feature points of the second subject image without searching the entire area of the second image and thus it is possible to largely reduce the processing time for the corresponding feature point detection process. As a result, it is possible to largely reduce the processing time for calculating the distance "a" to the subject 100 based on the image magnification ratio "MR" between the subject images.

Further, although the two optical systems (the first optical system OS1 and the second optical system OS2) are used in the above embodiments, the number of the optical systems used in the present invention is not limited thereto. For example, an aspect containing an additional optical system in addition to the first optical system OS1 and the second optical system OS2 is also involved within the scope of the present invention. In this case, the additional optical system is configured and arranged so that a change of a magnification of a subject image formed by the additional optical system according to the distance "a" to the subject 100 is different from the change of the magnification "$m_1$" of the first subject image according to the distance "a" to the subject 100 and the change of the magnification "$m_2$" of the second subject image according to the distance "a" to the subject 100.

Further, although the first optical system OS1 and the second optical system OS2 in each of the first to third embodiments are configured and arranged so as to satisfy one of the above-described three conditions required for calculating the distance "a" to the subject 100 based on the image magnification ratio "MR", the present invention is not limited thereto as long as the first optical system OS1 and the second optical system OS2 are configured and arranged so as to satisfy at least one of the above-described three conditions. For example, an aspect in which the first optical system OS1 and the second optical system OS2 are configured and arranged so as to satisfy all or some of the above-described three conditions is also involved within the scope of the present invention.

Distance Measuring Method

Figure 10:
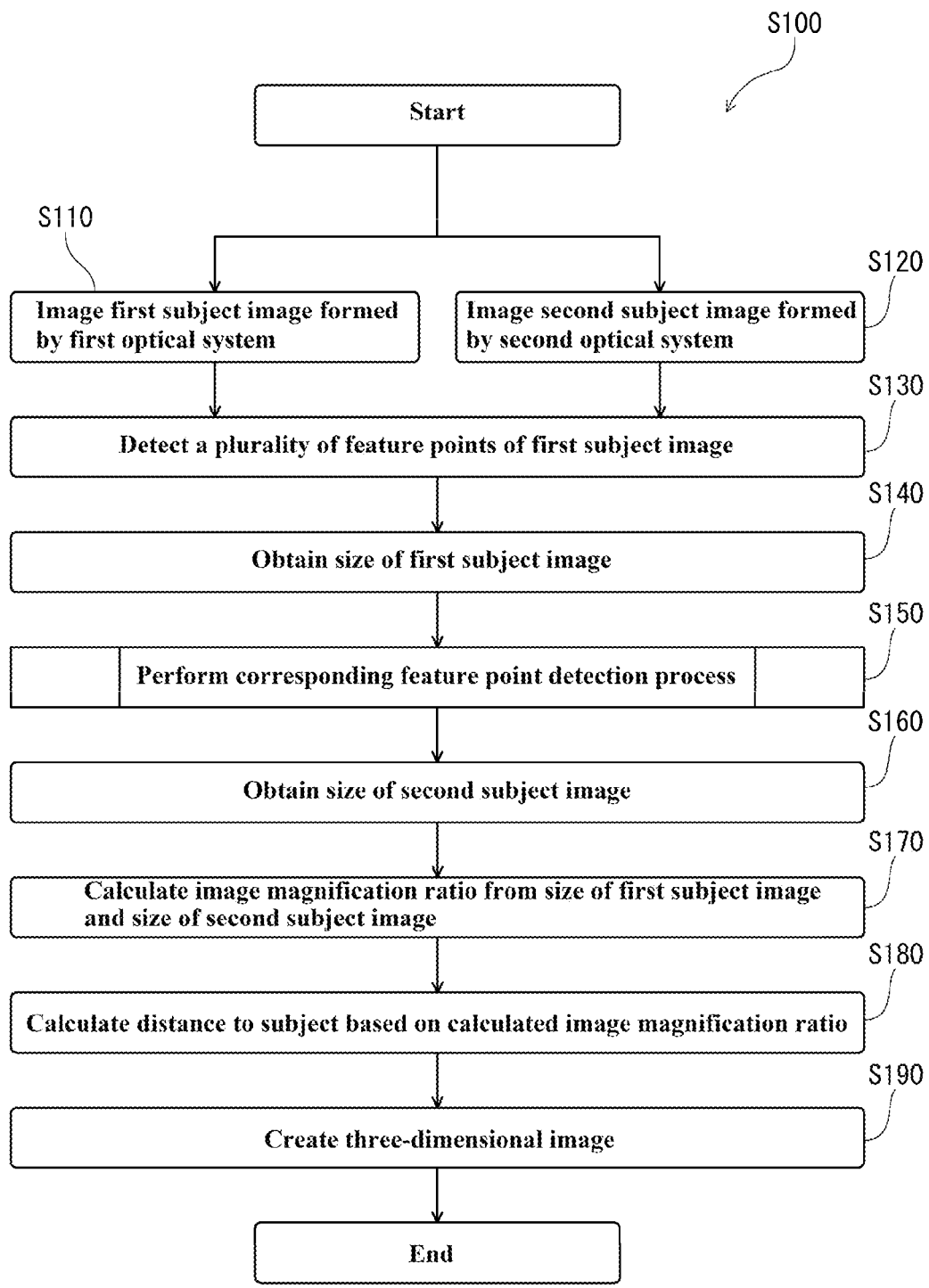
FIG. 10 is a flowchart for explaining a distance measuring method performed by the distance measuring camera of the present invention.
Figure 11:
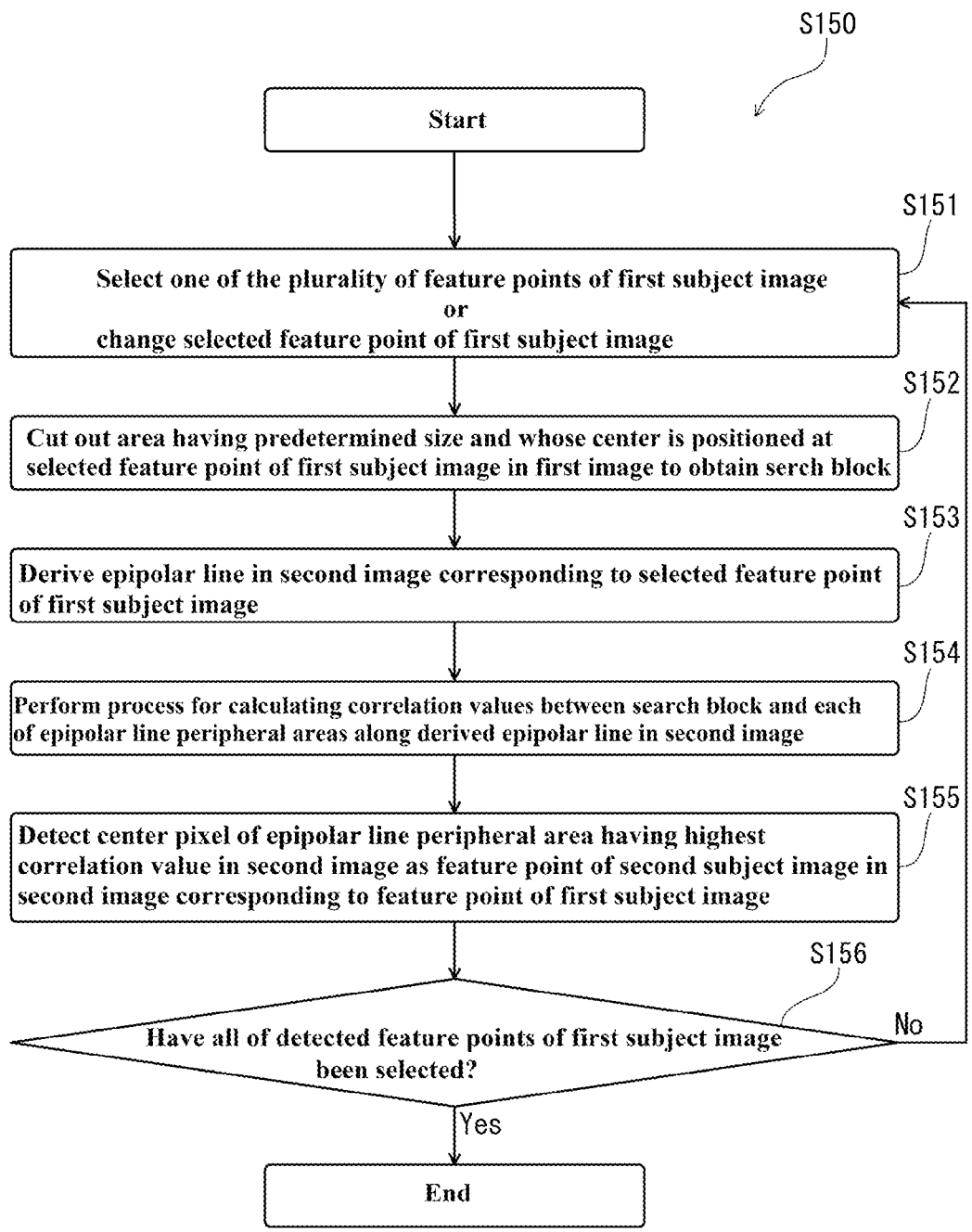
FIG. 11 is a flowchart illustrating details of a corresponding feature point detection process performed in the distance measuring method shown in FIG. 10.

Next, a distance measuring method performed by the distance measuring camera 1 of the present invention will be described with reference to FIGS. 10 and 11. FIG. 10 is a flowchart for explaining the distance measuring method performed by the distance measuring camera of the present invention. FIG. 11 is a flowchart for explaining details of the corresponding feature point detection process performed in the distance measuring method shown in FIG. 10.

The distance measuring method described in the following description can be performed by using the distance measuring cameras 1 according to the first to third embodiments of the present invention and an arbitrary device having the same function as that of the distance measuring camera 1. For the sake of explanation, it is assumed that the distance measuring method is performed by using the distance measuring camera 1 according to the first embodiment.

A distance measuring method S100 shown in FIG. 10 starts when the user of the distance measuring camera 1 uses the operation part 8 to perform an operation for measuring the distance "a" to the subject 100. At a step S110, the first image sensor S1 of the first imaging system IS1 images the first subject image formed by the first optical system OS1 to obtain the first image (first image data) containing the first subject image. The first image is transmitted to the control part 2 and the size obtaining part 3 through the data bus 10. Similarly, at a step S120, the second image sensor S2 of the second imaging system IS2 images the second subject image formed by the second optical system OS2 to obtain the second image (second image data) containing the second subject image. The second image is transmitted to the control part 2 and the size obtaining part 3 through the data bus 10. In this regard, the obtaining of the first image at the step S110 may be performed simultaneously with or separately from the obtaining of the second image at the step S120.

After the first image and the second image are obtained at the steps S110 and S120, the distance measuring method S100 proceeds to a step S130. At the step S130, the size obtaining part 3 detects a plurality of arbitrary feature points of the first subject image in the first image. For example, examples of the plurality of arbitrary feature points of the first subject image detected by the size obtaining part 3 at the step S130 contain both edge portions in the height direction of the first subject image or both edge portions in the width direction of the first subject image. The coordinate ($x_1$, $y_1$) of each of the feature points of the first subject image detected by the size obtaining part 3 is temporarily stored in the memory of the control part 2.

At a step S140, the size obtaining part 3 refers to the coordinate ($x_1$, $y_1$) of each of the feature points of the first subject image temporarily stored in the memory of the control part 2 and measures a distance between the plurality of detected feature points of the first subject image to obtain the size "$Y_{FD1}$" of the first subject image. The size "$Y_{FD1}$" of the first subject image obtained at the step S140 is temporarily stored in the memory of the control part 2.

After that, at a step S150, the size obtaining part 3 performs the corresponding feature point detection process for detecting a plurality of feature points of the second subject image in the second image respectively corresponding to the plurality of feature points of the first subject image detected at the step S130. FIG. 11 shows the flow chart illustrating the details of the corresponding feature point detection process performed at the step S150.

At a step S151, the size obtaining part 3 refers to the coordinate ($x_1$, $y_1$) of each of the feature points of the first subject image stored in the memory of the control part 2 and selects any one of the detected feature points of the first subject image. Next, at a step S152, the size obtaining part 3 cuts out an area having a predetermined size and whose center is positioned at the selected feature point of the first subject image in the first image (for example, 5×5 pixel area, 7×7 pixel area or the like whose center is positioned at the selected feature point) to obtain a search block for the selected feature point. The obtained search block is temporarily stored in the memory of the control part 2.

Next, at a step S153, the size obtaining part 3 uses the fixed values stored in the memory of the control part 2 to derive an epipolar line in the second image corresponding to the feature point of the first subject image selected at the step S151 according to the above-described general equation (28) (or the simplified equation representing the epipolar line in each embodiment). After that, at a step S154, the size obtaining part 3 performs the convolution calculation (the convolution integration) between the search block for the selected feature point of the first subject image stored in the memory of the control part 2 and each of epipolar line peripheral areas having the same size as that of the search block and whose centers are respectively positioned at pixels on the derived epipolar line in the second image to calculate correlation values between the search block and each of the epipolar line peripheral areas. The calculated correlation values are temporarily stored in the memory of the control part 2. This calculation of the correlation values is also referred to as "a block matching" and is performed along the derived epipolar line in the second image.

When the calculation of the correlation values along the epipolar line in the second image is completed, the process of the step S150 proceeds to a step S155. At the step S155, the size obtaining part 3 detects a center pixel of the epipolar line peripheral area (i.e., a pixel on the epipolar line) having a highest correlation value as the feature point of the second subject image in the second image corresponding to the selected feature point of the first subject image. The calculated coordinate ($x_2$, $y_2$) of the feature point of the second subject image is temporarily stored in the memory of the control part 2.

After that, at a step S156, it is determined whether or not all of the feature points of the first subject image detected at the step S130 have been selected at the step S151. When all of the feature points of the first subject image detected at the step S130 have not been selected at the step S151 (the step S156="No"), the process of the step S150 returns to the step S151. At the step S151, an unselected one of the feature points of the first subject image is newly selected and thus the selected feature point of the first subject image is updated. The processes of the steps S151 to S155 are repeatedly performed with changing the selected feature point of the first subject image until all of the feature points of the second subject image in the second image respectively corresponding to the detected feature points of the first subject image are detected.

When all of the feature points of the first subject image detected at the step S130 have been selected at the step S151 (the step S156="Yes"), the process of step S150 ends. When the process of the process S150 is ends, the distance measuring method S100 proceeds to a step S160.

Referring back to FIG. 10, at the step S160, the size obtaining part 3 measures a distance between the plurality of detected feature points of the second subject image to obtain the size "$Y_{FD2}$" of the second subject image. The size "$Y_{FD2}$" of the second subject image obtained at the step S160 is temporarily stored in the memory of the control part 2.

When the size "$Y_{FD1}$" of the first subject image and the size "$Y_{FD2}$" of the second subject image are obtained by the size obtaining part 3, the distance measuring method S100 proceeds to a step S170. At the step S170, the distance calculating part 5 calculates the image magnification ratio "MR" between the magnification "$m_1$" of the first subject image and the magnification "$m_2$" of the second subject image from the size "$Y_{FD1}$" of the first subject image and the size "$Y_{FD2}$" of the second subject image temporarily stored in the memory of the control part 2 according to the above equation (14) "MR"="$Y_{FD2}$"/"$Y_{FD1}$". Next, at a step S180, the distance calculating part 5 refers to the association information stored in the association information storage part 4 to calculate the distance "a" to the subject 100 based on the calculated image magnification ratio "MR". If the association information is the above-described equation for calculating the distance "a" to the subject 100, the distance calculating part 5 calculates the distance "a" to the subject 100 by referring to the fixed values stored in the memory of the control part 2 in addition to the association information.

When the distance calculating part 5 calculates the distance "a" to the subject 100 at the step S180, the distance measuring method S100 proceeds to a step S190. At the step S190, the three-dimensional image creating part 6 creates the three-dimensional image of the subject 100 based on the distance "a" to the subject 100 calculated by the distance calculating part 5 and the color or monochrome luminance information of the subject 100 (the first image or the second image) obtained by the first image sensor S1 or the second image sensor S2. In the case where each of the first image sensor S1 and the second image sensor S2 is the phase sensor for obtaining the phase information of the subject 100, the step S190 is omitted.

After that, the color or monochrome luminance information or the phase information of the subject 100, the distance "a" to the subject 100 and/or the three-dimensional image of the subject 100 obtained in the preceding steps are displayed on the display part 7 or transmitted to the external devices by the communication part 9 and then the distance measuring method S100 ends.

Although the distance measuring camera of the present invention has been described based on the embodiments shown in the accompanying drawings, the present invention is not limited thereto. The configuration of each component of the present invention may be possibly replaced with other arbitrary configurations having equivalent functions. Further, it may be also possible to add other arbitrary components to the configuration of the present invention.

A Person having ordinary skill in the art and technology of the present invention would perform alterations and modifications in the described configuration of the distance measuring camera of the present invention without meaningfully departing from the principle, spirit and scope of the present invention and the distance measuring camera having the modified configuration is also contained in the scope of the present invention. For example, an aspect in which the distance measuring cameras of the first to third embodiments are appropriately combined is also involved within the scope of the present invention.

For example, the number and kinds of the components of the distance measuring camera shown in FIGS. 7 to 9 are merely provided for the illustration of the present invention and thus the present invention is not necessarily limited thereto. The scope of the present invention involves alternations and modifications of the described configuration in which arbitrary components are added or combined or arbitrary components are omitted without meaningfully departing from the principle and the spirit of the present invention. Further, each component of the distance measuring camera may be practiced by hardware, software or a combination of hardware and software.

In addition, the number and kinds of steps of the distance measuring method S100 shown in FIGS. 10 and 11 are merely illustrative examples and the present invention is not necessarily limited thereto. Aspects in which any step is added or combined or any step is deleted are also involved within the scope of the present invention without departing from the principles and intent of the present invention.

INDUSTRIAL APPLICABILITY

The distance measuring camera of the present invention utilizes the epipolar line based on the epipolar geometry for the search of the feature points in the corresponding feature point detection process for detecting the plurality of feature point of one of the subject images respectively corresponding to the plurality of feature points of the other one of the subject images. Therefore, it is possible to reduce the processing time for calculating the distance to the subject based on the image magnification ratio between the subject images. For the reasons stated above, the present invention has industrial applicability.

The invention claimed is:
1. A distance measuring camera, comprising:
   a first imaging system including a first optical system for collecting light from a subject to form a first subject image and a first image sensor for imaging the first subject image to obtain a first image containing the first subject image;
   a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image;
   a size obtaining part for detecting a plurality of feature points of the first subject image in the first image and measuring a distance between the plurality of feature points of the first subject image to obtain a size of the first subject image and detecting a plurality of feature points of the second subject image in the second image respectively corresponding to the plurality of feature points of the first subject image and measuring a distance between the plurality of feature points of the second subject image to obtain a size of the second subject image; and
   a distance calculating part for calculating a distance to the subject by using at least:
      an image magnification ratio between a magnification of the first subject image and a magnification of the second subject image which is obtained as a ratio between the size of the first subject image and the size of the second subject image obtained by the size obtaining part,
      a focal length of the first optical system,
      a focal length of the second optical system,
      a distance from an exit pupil of the first optical system to an image formation position of the first subject image when the subject is located at an infinite distance point,
      a distance from an exit pupil of the second optical system to an image formation position of the second subject image when the subject is located at the infinite distance point,
      a distance from a front principal point of the first optical system to the subject when the first subject image is in best focus on an imaging surface of the first image sensor, and
      a distance from a front principal point of the second optical system to the subject when the second subject image is in the best focus on an imaging surface of the second image sensor, and
   wherein the size obtaining part detects the plurality of feature points of the second subject image in the second image by searching pixels on a plurality of epipolar lines in the second image respectively corresponding to the plurality of feature points of the first subject image.

2. The distance measuring camera as claimed in claim 1, wherein the size obtaining part derives the plurality of epipolar lines in the second image respectively corresponding to the plurality of feature points of the first subject image based on a model in which characteristics and arrangements of the first imaging system and the second imaging system are taken into consideration.

3. The distance measuring camera as claimed in claim 2, wherein each of the epipolar lines in the second image respectively corresponding to the plurality of feature points of the first subject image is represented by the following equation (1)

$$yv_2 = \frac{(G_1G_6 - G_2G_5)xu_2 + G_3G_6 - G_4G_5}{G_1G_4 - G_2G_3} \quad (1)$$

where
$$\begin{cases} G_1 = EP_2L_1(R_{32}yv_1 + R_{31}xu_1) + K_1(EP_2D + L_2) \\ G_2 = EP_1EP_2(R_{32}yv_1 + R_{31}xu_1) + EP_2K_1R_{33} \\ G_3 = -K_2L_1(R_{12}yv_1 + R_{11}xu_1) + K_1K_2P_x \\ G_4 = -K_2EP_1(R_{12}yv_1 + R_{11}xu_1) - K_1K_2R_{13} \\ G_5 = -K_2L_1(R_{22}yv_1 + R_{21}xu_1) + K_1K_2P_y \\ G_6 = K_2EP_1(R_{22}yv_1 + R_{21}xu_1) - K_1K_2R_{23} \\ \\ xu_1 = x_1 - u_1 \\ yv_1 = y_1 - v_1 \\ xu_2 = x_2 - u_2 \\ yv_2 = y_2 - v_2 \\ \\ K_1 = \frac{f_1 \cdot (f_1^2 - EP_1 \cdot f_1 + EP_1 \cdot a_{FD1})}{PS_1 \cdot (a_{FD1} - f_1)} \\ K_2 = \frac{f_2 \cdot (f_2^2 - EP_2 \cdot f_2 + EP_2 \cdot a_{FD2})}{PS_2 \cdot (a_{FD2} - f_2)} \\ L_1 = f_1^2 - EP_1 \cdot f_1 \\ L_2 = f_2^2 - EP_2 \cdot f_2 \end{cases}$$

where "xi" and "yi" are respectively x and y coordinates of arbitrary one of the plurality of feature points of the first subject image in the first image, "x2" and "y2" are respectively x and y coordinates of a feature point of the second subject image in the second image corresponding to the arbitrary one of the plurality of feature points of the first subject image, "Px" and "Py" are respectively values in x and y directions of a parallel disparity between the front principal point of the first optical system and the front principal point of the second optical system, "D" is a depth disparity in the optical axis direction of the first optical system or the second optical system between the first optical system and the second optical system, "PS1" is a pixel size of the first image sensor, "PS$_2$" is a pixel size of the second image sensor, "fi" is the focal length of the first optical system, "f$_2$" is the focal length of the second optical system, "EP1" is the distance from the exit pupil of the first optical system to the image formation position of the first subject image when the subject is located at an infinite distance point, "EP2" is the distance from the exit pupil of the second optical system to the image formation position of the second subject image when the subject is located at the infinite distance point, "a$_{FD}$1" is the distance from the front principal point of the first optical system to the subject when the first subject image is in best focus on the imaging surface of the first image sensor, "a$_{FD}$2" is the distance from the front principal point of the second optical system to the subject when the second subject image is in the best focus on the imaging surface of the second image sensor, "u$_1$" and "vi" are respectively x and y coordinates of an optical axis of the first optical system in the first image, "u2" and "v2" are respectively x and y coordinates of an optical axis of the second optical system in the second image, and "R$_{11}$", "R$_{12}$", "R$_{13}$", "R$_{21}$", "R$_{22}$", "R$_{23}$", "R$_{31}$", "R$_{32}$" and "R$_{33}$" are components of a rotation matrix of the second imaging system with respect to the first imaging system.

4. The distance measuring camera as claimed in claim 1, wherein the first optical system and the second optical system are configured so that a change of the magnification of the first subject image according to the distance to the subject is different from a change of the magnification of the second subject image according to the distance to the subject.

5. The distance measuring camera as claimed in claim 4, wherein the first optical system and the second optical system are configured so that the focal length of the first optical system and the focal length of the second optical system are different from each other, and thereby the change of the magnification of the first subject image according to the distance to the subject is different from the change of the magnification of the second subject image according to the distance to the subject.

6. The distance measuring camera as claimed in claim 4, wherein the first optical system and the second optical system are configured so that the distance from the exit pupil of the first optical system to the image formation position of the first subject image formed by the first optical system when the subject is located at the infinite distance point is different from the distance from the exit pupil of the second optical system to the image formation position of the second subject image formed by the second optical system when the subject is located at the infinite distance point, and thereby the change of the magnification of the first subject image according to the distance to the subject is different from the change of the magnification of the second subject image according to the distance to the subject.

7. The distance measuring camera as claimed in claim 4, wherein a depth disparity in the optical axis direction of the first optical system or the second optical system exists between the front principal point of the first optical system and the front principal point of the second optical system, and thereby the change of the magnification of the first subject image according to the distance to the subject is different from the change of the magnification of the second subject image according to the distance to the subject.

8. The distance measuring camera as claimed in claim 1, wherein the distance calculating part calculates the distance to the subject by further using a depth disparity in the optical axis direction of the first optical system or the second optical system between the first optical system and the second optical system.

9. A distance measuring camera, comprising:
a first imaging system including a first optical system for collecting light from a subject to form a first subject image and a first image sensor for imaging the first subject image to Obtain a first image containing the first subject image;
a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image;
a size obtaining part for detecting a plurality of feature points of the first subject image in the first image and measuring a distance between the plurality of feature points of the first subject image to obtain a size of the first subject image and detecting a plurality of feature points of the second subject image in the second image respectively corresponding to the plurality of feature points of the first subject image and measuring a distance between the plurality of feature points of the second subject image to obtain a size of the second subject image; and a distance calculating part for calculating a distance to the subject based on an image magnification ratio between a magnification of the first subject image and a magnification of the second subject image which is obtained as a ratio between the size of the first subject image and the size of the second subject image obtained by the size obtaining part, wherein the size obtaining part detects the plurality of feature points of the second subject image in the second image by searching pixels on a plurality of epipolar lines in the second image respectively corresponding to the plurality of feature points of the first subject image, wherein the size obtaining part derives the plurality of epipolar lines in the second image respectively corresponding to the plurality of feature points of the first subject image based on a model in which characteristics and arrangements of the first imaging system and the second imaging system are taken into consideration, and wherein each of the epipolar lines in the second image respectively corresponding to the plurality of feature points of the first subject image is represented by the following equation (1)

$$yv_2 = \frac{(G_1 G_6 - G_2 G_5) x u_2 + G_3 G_6 - G_4 G_5}{G_1 G_4 - G_2 G_3} \quad (1)$$

where
$$\begin{cases} G_1 = EP_2 L_1 (R_{32} yv_1 + R_{31} xu_1) + K_1 (EP_2 D + L_2) \\ G_2 = EP_1 EP_2 (R_{32} vy_1 + R_{31} xu_1) + EP_2 K_1 R_{33} \\ G_3 = -K_2 L_1 (R_{12} yv_1 + R_{11} xu_1) + K_1 K_2 P_x \\ G_4 = -K_2 EP_1 (R_{12} yv_1 + R_{11} xu_1) - K_1 K_2 R_{13} \\ G_5 = -K_2 L_1 (R_{22} yv_1 + R_{21} xu_1) + K_1 K_2 P_y \\ G_6 = K_2 EP_1 (R_{22} yv_1 + R_{21} xu_1) - K_1 K_2 R_{23} \\ \\ xu_1 = x_1 - u_1 \\ yv_1 = y_1 - v_1 \\ xu_2 = x_2 - u_2 \\ yv_2 = y_2 - v_2 \\ \\ K_1 = \dfrac{f_1 \cdot (f_1^2 - EP_1 \cdot f_1 + EP_1 \cdot a_{FD1})}{PS_1 \cdot (a_{FD1} - f_1)} \\ K_2 = \dfrac{f_2 \cdot (f_2^2 - EP_2 \cdot f_2 + EP_2 \cdot a_{FD2})}{PS_2 \cdot (a_{FD2} - f_2)} \\ L_1 = f_1^2 - EP_1 \cdot f_1 \\ L_2 = f_2^2 - EP_2 \cdot f_2 \end{cases}$$

where "xi" and "yi" are respectively x and y coordinates of arbitrary one of the plurality of feature points of the first subject image in the first image, "x$_2$" and "y2" are respectively x and y coordinates of a feature point of the second subject image in the second image corresponding to the arbitrary one of the plurality of feature points of the first subject image, "Px" and "Py" are respectively values in x and y directions of a parallel disparity between a front principal point of the first optical system and a front principal point of the second optical system, "D" is a depth disparity in the optical axis direction of the first optical system or the second optical system between the first optical system and the second optical system, "PS$_1$" is a pixel size of the first image sensor, "PS$_2$" is a pixel size of the second image sensor, "fi" is a focal length of the first optical system, "f$_2$" is a focal length of the second optical system, "EP1" is a distance from an exit pupil of the first optical system to an image formation position of the first subject image when the subject is located at an infinite distance point, "EP2" is a distance from an exit pupil of the second optical system to an image formation position of the second subject image when the subject is located at the infinite distance point, "aFD1" is a distance from the front principal point of the first optical system to the subject when the first subject image is in best focus on an imaging surface of the first image sensor, "a$_{FD}$2" is a distance from the front principal point of the second optical system to the subject when the second subject image is in the best focus on an imaging surface of the second image sensor, "u$_1$" and "vi" are respectively x and y coordinates of an optical axis of the first optical system in the first image, "u2" and "v2" are respectively x and y coordinates of an optical axis of the second optical system in the second image, and "R$_1$", "R12", "R13", "R21", "R22", "R23", "R$_{31}$", "R32" and "R33" are components of a rotation matrix of the second imaging system with respect to the first imaging system.

10. A distance measuring camera, comprising:

a first imaging system including a first optical system for collecting light from a subject to form a first subject image and a first image sensor for imaging the first subject image to obtain a first image containing the first subject image;

a second imaging system including a second optical system for collecting the light from the subject to form a second subject image and arranged so as to be shifted from the first optical system in a direction perpendicular to an optical axis direction of the first optical system and a second image sensor for imaging the second subject image to obtain a second image containing the second subject image;

a size obtaining part for detecting a plurality of feature points of the first subject image in the first image and measuring a distance between the plurality of feature points of the first subject image to obtain a size of the first subject image and detecting a plurality of feature points of the second subject image in the second image respectively corresponding to the plurality of feature points of the first subject image and measuring a distance between the plurality of feature points of the second subject image to obtain a size of the second subject image; and a distance calculating part for calculating a distance to the subject based on an image magnification ratio between a magnification of the first subject image and a magnification of the second subject image which is obtained as a ratio between the size of the first subject image and the size of the second subject image obtained by the size obtaining part, wherein the size obtaining part detects the plurality of feature points of the second subject image in the second image by searching pixels on a plurality of epipolar lines in the second image respectively corresponding to the plurality of feature points of the first subject image, wherein the first optical system and the second optical system are configured so that a change of the magnification of the first subject image according to the distance to the subject is different from a change of the magnification of the second subject image according to the distance to the subject, and wherein the first optical system and the second optical system are configured so that a distance from an exit pupil of the first optical system to an image formation position of the first subject image formed by the first optical system when the subject is located at an infinite distance point is different from a distance from an exit pupil of the second optical system to an image formation position of the second subject image formed by the second optical system when the subject is located at the infinite distance point, and thereby the change of the magnification of the first subject image according to the distance to the subject is different from the change of the magnification of the second subject image according to the distance to the subject.

* * * * *